(12) United States Patent
Bedoya Martinez et al.

(10) Patent No.: US 8,164,519 B1
(45) Date of Patent: Apr. 24, 2012

(54) FAST ACQUISITION ENGINE

(75) Inventors: Mario A. Bedoya Martinez, Bradford-on-Avon (GB); Gareth Williams, Nr Devizes (GB); David P. Tester, Hayden Wick Swindon (GB)

(73) Assignee: u-blox AG, Thalwil (CH)

( * ) Notice: Subject to any disclaimer, the term of this patent is extended or adjusted under 35 U.S.C. 154(b) by 134 days.

(21) Appl. No.: 12/468,242

(22) Filed: May 19, 2009

Related U.S. Application Data

(60) Provisional application No. 61/054,532, filed on May 20, 2008.

(51) Int. Cl.
*G01S 19/30* (2010.01)
*G01S 19/31* (2010.01)

(52) U.S. Cl. .............................. 342/357.69; 342/357.71

(58) Field of Classification Search .............. 342/357.25, 342/357.63, 357.69, 357.71; 701/207, 213
See application file for complete search history.

(56) References Cited

U.S. PATENT DOCUMENTS

| | | | |
|---|---|---|---|
| 5,109,390 A * | 4/1992 | Gilhousen et al. | 370/335 |
| 5,365,450 A | 11/1994 | Schuchman et al. | |
| 5,408,239 A | 4/1995 | Endo | |
| 5,440,597 A * | 8/1995 | Chung et al. | 375/149 |
| 5,661,460 A | 8/1997 | Sallen et al. | |
| 5,663,734 A | 9/1997 | Krasner | |
| 6,069,583 A | 5/2000 | Silvestrin et al. | |
| 6,133,873 A | 10/2000 | Krasner | |
| 6,175,561 B1 * | 1/2001 | Storm et al. | 370/342 |
| 6,639,516 B1 | 10/2003 | Copley | |
| 6,683,564 B1 | 1/2004 | McBurney | |
| 7,133,685 B2 | 11/2006 | Hose et al. | |
| 7,148,844 B2 | 12/2006 | Salkhi | |
| 7,151,950 B1 | 12/2006 | Oyang et al. | |
| 7,375,682 B1 | 5/2008 | Tester et al. | |
| 7,460,064 B1 | 12/2008 | Tester et al. | |
| 7,538,722 B2 | 5/2009 | Thandu et al. | |
| 7,538,726 B1 | 5/2009 | Tester et al. | |
| 7,561,101 B1 | 7/2009 | Tester et al. | |
| 7,564,403 B2 | 7/2009 | Tester et al. | |
| 7,894,987 B1 | 2/2011 | Tester et al. | |
| 8,054,220 B1 | 11/2011 | Tester et al. | |
| 2003/0006931 A1 | 1/2003 | Mages | |
| 2003/0045275 A1 | 3/2003 | McDonagh et al. | |
| 2003/0151547 A1 | 8/2003 | Mauro et al. | |
| 2005/0170846 A1 | 8/2005 | Jeon et al. | |
| 2005/0225483 A1 | 10/2005 | Abraham et al. | |
| 2006/0055596 A1 | 3/2006 | Bryant et al. | |
| 2006/0099969 A1 | 5/2006 | Staton et al. | |
| 2006/0152409 A1 | 7/2006 | Raman et al. | |
| 2007/0042790 A1 | 2/2007 | Mohi et al. | |
| 2007/0057841 A1 | 3/2007 | McBurney et al. | |
| 2007/0118286 A1 | 5/2007 | Wang et al. | |
| 2007/0152876 A1 | 7/2007 | Wang et al. | |

(Continued)

*Primary Examiner* — Dao Phan

(57) ABSTRACT

A method of fast acquisition of a location of a device is disclosed. The method generally includes the steps of (A) repeatedly powering up automatically (i) a radio receiver and (ii) a given subset of a plurality of correlators in some of a plurality of search engines in the device, (B) buffering first data of a plurality of position signals received through the radio receiver over a first period, each of the position signals comprising a respective one of a plurality of code sequences, (C) searching through the first data with the correlators to find at least one of the code sequences, each of the correlators using a search window comprising a fraction of a code length of the code sequences and (D) generating an output signal carrying a location of the device based on the position signals corresponding to the code sequences that were found.

22 Claims, 23 Drawing Sheets

U.S. PATENT DOCUMENTS

| | | |
|---|---|---|
| 2007/0152878 A1 | 7/2007 | Wang et al. |
| 2007/0237269 A1 | 10/2007 | Lillo et al. |
| 2008/0104227 A1 | 5/2008 | Birnie et al. |
| 2008/0146890 A1 | 6/2008 | LeBoeuf et al. |
| 2008/0228398 A1 | 9/2008 | Syrjarinne et al. |
| 2009/0018773 A1 | 1/2009 | Niva et al. |
| 2009/0239470 A1 | 9/2009 | Sherman |
| 2009/0245167 A1 | 10/2009 | Abraham et al. |
| 2011/0115670 A1 | 5/2011 | Abraham |

* cited by examiner

TABLE I

| | MAX SAMPLES IN EVERY 1ms | | 16368 | MAX SAMPLES OUT EVERY 1ms | 2046 |
|---|---|---|---|---|---|
| PPM | FREQUENCY OFFSET | EQUIVALENT FREQUENCY | SKIPPED CYCLES PER 1023 CHIPS | RESAMPLING RATIO | SAMPLES OUT |
| 0.628 | 1000 | 1022000 | 1 | 8.0078 | 2044 |
| 1.256 | 2000 | 1021000 | 2 | 8.0157 | 2042 |
| 1.884 | 3000 | 1020000 | 3 | 8.0235 | 2040 |
| 2.513 | 4000 | 1019000 | 4 | 8.0314 | 2038 |
| 3.141 | 5000 | 1018000 | 5 | 8.0393 | 2036 |
| 3.769 | 6000 | 1017000 | 6 | 8.0472 | 2034 |
| 4.397 | 7000 | 1016000 | 7 | 8.0551 | 2032 |
| 5.025 | 8000 | 1015000 | 8 | 8.0631 | 2030 |
| 5.653 | 9000 | 1014000 | 9 | 8.0710 | 2028 |
| 6.281 | 10000 | 1013000 | 10 | 8.0790 | 2026 |
| 6.910 | 11000 | 1012000 | 11 | 8.0870 | 2024 |
| 7.538 | 12000 | 1011000 | 12 | 8.0950 | 2022 |
| 8.166 | 13000 | 1010000 | 13 | 8.1030 | 2020 |
| 8.794 | 14000 | 1009000 | 14 | 8.1110 | 2018 |
| 9.422 | 15000 | 1008000 | 15 | 8.1190 | 2016 |
| 10.050 | 16000 | 1007000 | 16 | 8.1271 | 2014 |
| 10.678 | 17000 | 1006000 | 17 | 8.1352 | 2012 |
| 11.307 | 18000 | 1005000 | 18 | 8.1433 | 2010 |
| 11.935 | 19000 | 1004000 | 19 | 8.1514 | 2008 |
| 12.563 | 20000 | 1003000 | 20 | 8.1595 | 2006 |
| 13.191 | 21000 | 1002000 | 21 | 8.1677 | 2004 |
| 13.819 | 22000 | 1001000 | 22 | 8.1758 | 2002 |
| 14.447 | 23000 | 1000000 | 23 | 8.1840 | 2000 |
| 15.075 | 24000 | 999000 | 24 | 8.1922 | 1998 |
| 15.704 | 25000 | 998000 | 25 | 8.2004 | 1996 |
| 16.332 | 26000 | 997000 | 26 | 8.2086 | 1994 |
| 16.960 | 27000 | 996000 | 27 | 8.2169 | 1992 |
| 17.588 | 28000 | 995000 | 28 | 8.2251 | 1990 |
| 18.216 | 29000 | 994000 | 29 | 8.2334 | 1988 |
| 18.844 | 30000 | 993000 | 30 | 8.2417 | 1986 |
| 19.472 | 31000 | 992000 | 31 | 8.2500 | 1984 |
| 20.101 | 32000 | 991000 | 32 | 8.2583 | 1982 |

FIG. 5

TABLE II

| PARAMETER: | | COMMENT: |
|---|---|---|
| CODE (CODE GENERATOR) | 5 BITS | CODE INDICATOR |
| SEMI-COHERENT THRESHOLD | 14 BITS | ADJUST FOR IMPLEMENTATION |
| LMF INDICATOR | 1 BIT | ON/OFF |
| COHERENT THRESHOLD | 14 BITS | ADJUST FOR IMPLEMENTATION |
| COHERENT ACCUMULATION | 8 BITS | 1ms STEPS |
| ROUNDING STEPS | 1 BITS | ON/OFF |
| POWER REPORTING PERIOD | 4 BITS | RESOLUTION 10 ms STEPS |
| WINDOW SIZE | 2 BITS | 1023, 128, 32 |
| NUMBER OF CODES | 2 BITS | CONTROL INDICATOR:<br>-FULL SEARCH<br>-NARROW SEARCH<br>-RE-ACQUISITION<br>-SYMBOL BOUNDARY |
| CODE AND OFFSET | 5+X BITS | FOR MULTIPLE CODE SEARCHES. X FOR RE-ACQUISITION MODE. |
| NO. OF OUTPUTS TO REPORT PER FREQUENCY/CODE INCLUDES COHERENT AND SEMI-COHERENT | 2 BITS | 4, 8, 16, 32 OUTPUTS |
| MEASURE AVERAGE CODE POWER | 1 BIT | ON/OFF |
| SEARCHER OUTPUT: | | |
| MEAN POWER/ENERGY COHERENT | 15 BITS | ONCE EVERY 20 ms OR AVERAGE OVER REPORTING TIME |
| MEAN POWER/ENERGY SEMI-COHERENT | 15 BITS BUS | REPORTS COHERENT, SEMI-COHERENT ENERGY AND TIME OFFSETS |
| SCALE STEP | 3 BITS | NO. OF 1ms ACCUMULATION CYCLES |
| COHERENT RESULTS | 13 BITS X 2 | I, Q |
| ROUNDING STEPS | 4 BITS | FROM INTERNAL THRESHOLD |
| SEMI-COHERENT RESULTS | 14 BITS | $I^2+Q^2$ |

FIG. 8

FAST ACQUISITION ENGINE

CROSS REFERENCE TO RELATED APPLICATIONS

The present application claims the benefit of U.S. Provisional Application No. 61/054,532, filed May 20, 2008, which is hereby incorporated by reference in its entirety.

The present application is related to U.S. Patent Applications (i) Ser. No. 11/613,219, now U.S. Pat. No. 7,375,682, filed Dec. 20, 2006, (ii) Ser. No. 11/613,280, now U.S. Pat. No. 7,894,987, filed Dec. 20, 2006, (iii) Ser. No. 11/613,536, now U.S. Pat. No. 7,460,064, filed Dec. 20, 2006, (iv) Ser. No. 11/733,270, now U.S. Pat. No. 7,538,726, filed Apr. 10, 2007, (v) Ser. No. 12/039,865, filed Feb. 29, 2008, (vi) Ser. No. 11/960,842, filed Dec. 20, 2007 and (vii) Ser. No. 11/837,675, now U.S. Pat. No. 7,561,101, filed Aug. 13, 2007, all of which are hereby incorporated by reference in their entirety.

FIELD OF THE INVENTION

The present invention relates to a method and/or architecture for satellite positioning systems generally and, more particularly, to a fast acquisition engine.

BACKGROUND OF THE INVENTION

Conventional positioning systems, such as Global Positioning System (GPS) receivers, are increasingly being integrated into battery operated user equipment (i.e., personal digital assistants and cellular telephones). The positioning systems calculate the locations of the user equipment based on signals received from the GPS satellites. The locations are used to provide applications and services for the benefit of the users. Owing to power consumption constraints in battery operated equipment, conventional positioning systems are normally only enabled on demand from the users.

SUMMARY OF THE INVENTION

The present invention concerns a method of fast acquisition of a location of a device. The method generally comprises the steps of (A) repeatedly powering up automatically (i) a radio receiver and (ii) a given subset of a plurality of correlators in some of a plurality of search engines in the device, (B) buffering first data of a plurality of position signals received through the radio receiver over a first period, each of the position signals comprising a respective one of a plurality of code sequences, (C) searching through the first data with the correlators to find at least one of the code sequences, each of the correlators using a search window comprising a fraction of a code length of the code sequences and (D) generating an output signal carrying a location of the device based on the position signals corresponding to the code sequences that were found.

The objects, features and advantages of the present invention include providing a method and/or architecture for a fast acquisition engine that may (i) consume little power to re-acquire position signals, (ii) operate on as few as 32 channels, (iii) maintain at most 24 search bins for each satellite code sequence, (iv) estimate signal strengths during initial parallel searches, (v) optimize additional searches using either coherent integration or non-coherent integration, (vi) utilize new satellite data for each subsequent search and/or (vii) hold the code sequences static in each search while rotating through a frequency range and a phase range in said satellite data.

BRIEF DESCRIPTION OF THE DRAWINGS

These and other objects, features and advantages of the present invention will be apparent from the following detailed description and the appended claims and drawings in which:

FIG. 5 is a Table I illustrating chip sliding as a function of frequency offset;

FIG. 8 is a list of parameters for a search;

DETAILED DESCRIPTION OF THE PREFERRED EMBODIMENTS

The present invention is a general combination of a fast acquisition architecture and associated control processes. The combination may enable a Global Positioning System (GPS) receiver to be "always on" by (i) efficiently supporting variable-rate duty-cycling, (ii) varying receiver sensitivity, (iii) varying accuracy of position calculations according to signal conditions and (iv) accounting for the accuracy requested by application modules that make use of the position information to dynamically optimize power consumption.

The following features may be used in support of always-on operations of a GPS receiver, even in battery operated, handheld equipment such as cellular telephones, digital picture cameras and digital video cameras, where power consumption is at a premium. White-Hot Start: The acquisition engine architecture is generally scaled to search a defined subset of the code and frequency space to allow rapid and power efficient tracking re-acquisition when duty-cycling power in the GPS receiver. The search space may be defined as a minimum space to achieve immediate re-acquisition under most, but not all, circumstances following a predefined maximum power-down period. Adaptive pseudorange collection: Power may be saved by varying the number of GPS satellites from which pseudo-ranges are collected. The adaptive pseudorange collection is another method by which positional accuracy may be traded-off against power consumption.

Figure 1:
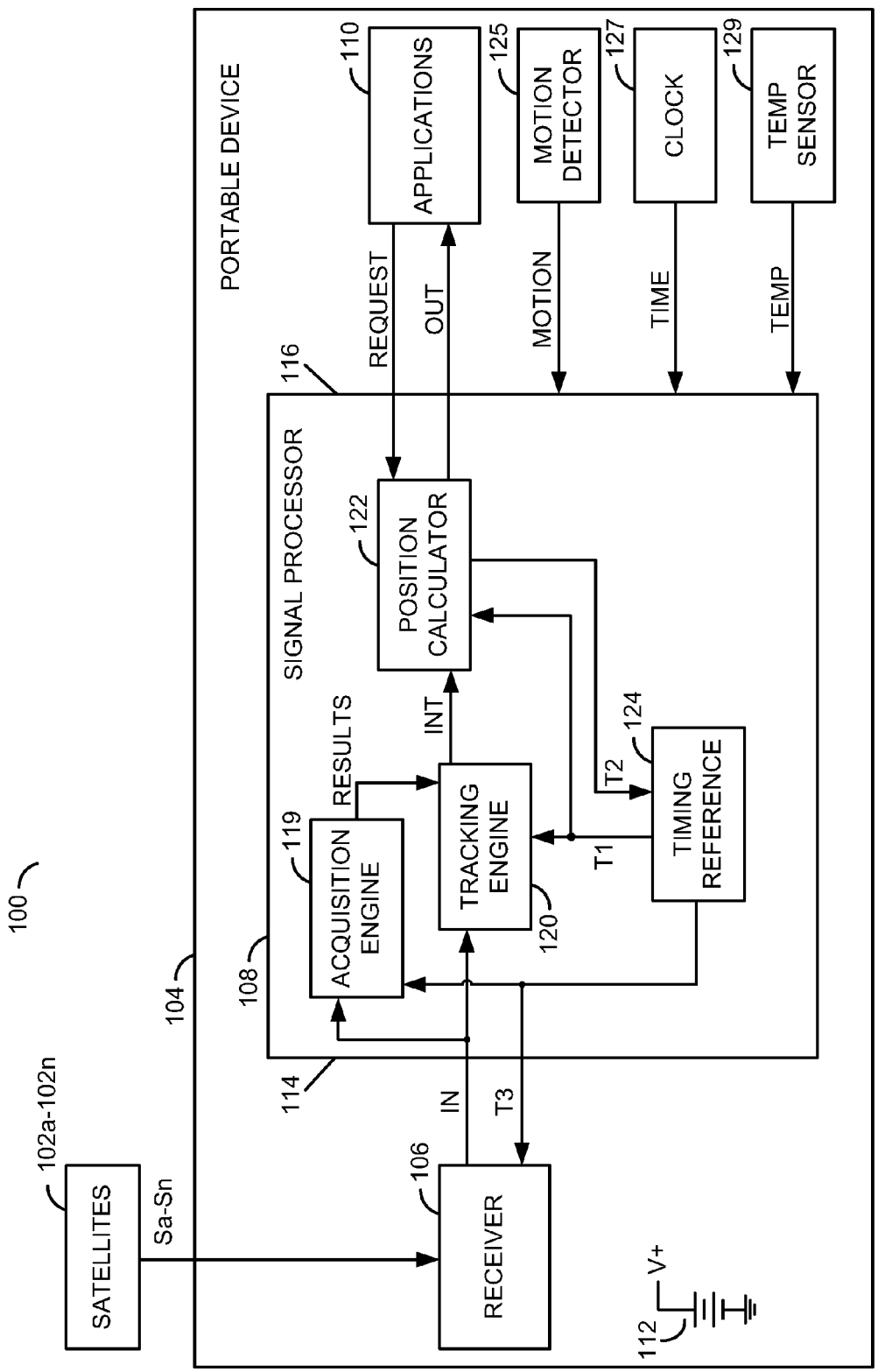
FIG. 1 is a block diagram of a system in accordance with a preferred embodiment of the present invention.

Referring to FIG. 1, a block diagram of a system 100 is shown in accordance with a preferred embodiment of the present invention. The system (or architecture) 100 may be implemented as a satellite navigation system. The system 100 generally comprises multiple (e.g., 24 to 30) satellites 102a-102n and a device (or circuit) 104. Each of the satellites 102a-102n may generate a respective signal (e.g., Sa-Sn) receivable by the device 104. Due to the positioning of the satellites 102a-102n and various obstructions, the device 104 may receive only a subset of the signals Sa-Sn at any given time. A position, a velocity and a current time (e.g., PVT) may be calculated by the device 104 based on the received signals Sa-Sn.

In some embodiments, the satellites 102a-102n may be part of the Global Positioning System (GPS) system. In other embodiments, the satellites 102a-102n may be part of the GLObal NAvigation Satellite System (GLONASS). Other space-based positioning systems, such as the proposed Galileo project, may be used as the source of the signals Sa-Sn. Earth-based positioning systems may be used to supplement the satellite-based systems. For example, the earth-based systems may provide a measurement of the current location by triangulation. Some embodiments may receive the position signals from any combination of two or more of the above satellite-based systems and/or Earth-based systems. For example, some of the position signals may be received from the GPS system while other position signals may be received from the GLONASS system simultaneously.

The device 104 may be implemented as a handheld (or portable) satellite receiver. The device 104 may be operational to calculate a device position, a device velocity (both magnitude and direction) and a current time using information from the signals Sa-Sn. The device 104 may be implemented as a variety of items, such as a cell phone, a personal digital assistant, a laptop computer, a GPS receiver, a heads-up display, a digital picture camera with built-in GPS, a digital video camera and other battery powered and/or handheld devices.

The device 104 generally comprises a circuit (or module) 106, a circuit (or module) 108, a circuit (or module) 110, a circuit (or module) 112, an optional circuit (or module) 125, an optional circuit (or module) 127 and an optional circuit (or module) 129. The signals Sa-Sn may be received by the circuit 106. An input signal (e.g., IN) may be generated by the circuit 106 and presented to the circuit 108 through an interface 114. The circuit 108 may generate a timing signal (e.g., T3) that is transferred back to the circuit 106 though the interface 114. An output signal (e.g., OUT) may be generated by the circuit 108 and presented through an interface 116 to a circuit 110. The circuit 110 may generate and present a request signal (e.g., REQUEST) to the circuit 108 through the interface 116. A signal (e.g., MOTION) may be generated by the circuit 125 and presented to the circuit 108. A signal (e.g., TIME) may also be generated by the circuit 127 and presented to the circuit 108. The circuit 129 may generate and present a signal (e.g., TEMP) to the circuit 108.

The circuit 106 may be implemented as a radio front-end receiver. The circuit 106 may be operational to listen to the viewable satellites 102a-102n through the signals Sa-Sn and appropriate Earth-based transmissions, if implemented. Operationally, the circuit 106 may down-convert and digitize the available signals Sa-Sn to generate the signal IN. Implementations of the circuit 106 may be in hardware, software or a combination of both hardware and software.

The circuit 108 may be implemented as a signal processor circuit. The circuit 108 is generally operational to calculate the device position and the device velocity based on the information received in the signal IN. Furthermore, the circuit 108 may maintain a current time for the device 104. Timing related information may be presented from the circuit 108 to the circuit 106 in the signal T3. Some or all of the device position, the device velocity and the current time may be presented from the circuit 108 to the circuit 110 in the signal OUT either periodically, aperiodically and/or on demand in response to a request made by assertion of the signal REQUEST. For example, an application (e.g., a cellular telephone function) in the circuit 110 may be configured to get a current location update periodically (e.g., every 20 seconds). If an update is missed for some reason, the system 100 may wait a short time (e.g., 5 seconds) and then deliver the updated location measurement.

The circuit 110 may be implemented as one or more processors executing one or more applications (e.g., software modules). The circuit 110 may be operational to utilize the device position, the device velocity and/or the current time to provide services and/or benefits to a user of the device 104. Examples of position-based services may include, but are not limited to, localized advertising, public service information, weather, traffic conditions, business hours, directions, proximity alarms, games, geotagging and other applications/services that depend on the user's location. Furthermore, the circuit 110 may include a cellular telephone capability. The cellular telephone capability may receive an interrupt when a new user location has been either measured or estimated. In some embodiments, the interrupt and new user location may be used to provide a location-based personalization of the phone application (e.g., automatically adjust the ring tone based on location).

The circuit 112 may be implemented as one or more batteries. The circuit 112 generally provides electrical power to all of the other circuits. The batteries may be implemented as replaceable batteries and/or rechargeable batteries. Other power sources may be implemented to meet the criteria of a particular application.

The interface 114 may implement a receiver interface. The interface 114 generally communicates the satellite information from the circuit 106 to the circuit 108 in the signal IN. Timing information and control signals may be presented from the circuit 108 back to the circuit 106 through the interface 114.

The interface 116 may be implemented as an application interface. The interface 116 generally communicates the device position, the device velocity and the current time from the circuit 108 to the circuit 110 periodically, aperiodically and/or on demand from an external application. The demand may be passed through the interface 116 in the signal REQUEST.

The circuit 125 may be implemented as a motion detector. The module 125 may be operational to generate information in the signal MOTION by detecting a physical movement of the device 104. Example embodiments of the module 125 may include, but are not limited to, (i) one or more mercury tilt-switches, (ii) a saturated inductor responsive to changes due to motion through the Earth's magnetic field, (iii) a Micro-Electro-Mechanical (MEM) membrane on a silicon device having a capacitance that fluctuates when subjected to mechanical impulses, (iv) a piezoelectric device microphonically responsive to mechanical impulses and/or (v) other sensors that detect whether the equipment is stationary or not.

The circuit 127 may be implemented as a clock module. The module 127 may be operational to time events in the device 104 as conveyed in the signal TIME. In some embodiments, the module 127 may provide count up/count down functions.

The circuit 129 may implement a temperature sensor. The circuit 129 may be operational to sense a local temperature of the device 108 and present the measured temperature in the signal TEMP. In some embodiments, the circuit 129 may be mounted on or near a crystal oscillator used by the circuit 108 to keep time.

The circuits 106, 108 and 127 are generally fabricated in (on) a single integrated circuit chip (or die). When not mounted on the crystal oscillator, the circuit 129 may be part of the same chip as the circuits 106, 108 and 127. In some embodiments, some or all of the circuit 110 may also be fabricated on the same chip as the circuits 106, 108 and 127. In still other embodiments, the circuit 125 may be fabricated on the same chip as the circuits 106, 108 and 127.

Referring still to FIG. 1, the circuit 108 generally comprises a circuit (or module) 119, a circuit (or module) 120, a circuit (or module) 122 and a circuit (or module) 124. The signal IN may be received by both the circuit 119 and the circuit 120. An intermediate signal (e.g., INT) may be generated by the circuit 120 and presented to the circuit 122. The circuit 122 may generate the signal OUT and receive the signal REQUEST. A timing signal (e.g., T1) may be generated by the circuit 124 and presented to both the circuit 120 and the circuit 122. A timing update signal (e.g., T2) may be generated by the circuit 122 and presented to the circuit 124. The circuit 124 may also generate the signal T3. The signal T3 may be received by the circuit 119 and the circuit 106. A signal (e.g., RESULTS) may be generated by the circuit 119 and presented to the circuit 120.

The circuit 119 may be implemented as an acquisition engine. The circuit 119 may be operational to perform a fast acquisition of the satellites 102a-102n that may be in view of the circuit 106. The circuit 119 may identify candidate bins within a search space where the signals Sa-Sn may be found.

The circuit 120 may be implemented as a tracking engine. The circuit 120 may be operational to track the different satellites 102a-102n based on the bins identified by the circuit 119. Searching is generally conducted across a frequency range to compensate for Doppler frequency shifts in the signals Sa-Sn caused by the relative motion of the device 104 and the satellites 102a-102n and to compensate for absolute frequency error and frequency drift of the local timing reference. The searching may also be conducted in a window of time to find the correct code-phase of pseudo-random code sequences in the signals Sa-Sn. Conclusions from the measured pseudoranges arising from the results of the code sequence searches generally give first approximations for a user time bias, reference epoch and a distance from the device 104 to respective satellites 102a-102n.

The circuit 120 may have a priori knowledge of which satellites 102a-102n are in view based on the time received via the signal T1, previous knowledge of the GPS system time and user location from previous operations. The circuit 120 may also have a good estimate of the satellite positions and the satellite velocities relative to the device 104. A good estimate of the resulting Doppler shifts may be calculated based on the estimated satellite positions and the estimated satellite velocities. Furthermore, the circuit 106 is generally aware of a local frequency reference that is (i) drifting relative to an absolute time (e.g., GPS time) and (ii) has an absolute frequency error. The device 104 may also generate an estimate of the device position and the device velocity. From the device position, the device velocity and the absolute frequency error, the circuit 120 may estimate the proper positions of the pseudo-random code sequences in the signals Sa-Sn transmitted from the available satellites 102a-102n. A result is generally a reduction in the searching performed while calculating the pseudorange to each of the satellites 102a-102n and hence a corresponding reduction in the power consumed in performing the calculations.

The circuit 122 may be implemented as a position calculator or navigation engine. The circuit 122 generally uses the pseudoranges to the several satellites 102a-102n, information regarding the Doppler shifts, knowledge of the satellite positions and knowledge of the satellite trajectories to calculate the device position and the device velocity of the device 104. Operations within the circuit 122 may be simplified by estimating the current device position and the current device velocity from knowledge of one or more previously calculated device positions and one or more previously calculated device velocities. In turn, the simplifications may result in a reduced power consumption.

The circuit 124 may be implemented as a timing reference circuit. The circuit 124 may be used to generate a current local time in the signal T1. Corrections to the current time may be made based on satellite timing information received from the circuit 122 in the signal T2. Timing information for the circuit 106 may be generated in the signal T3. The circuit 124 may be always powered and operate continuously directly or indirectly from the battery 112.

From time to time, the signals Sa-Sn from the satellites 102a-102n may not be clearly visible from the receiver 106. For example, signal degradation or signal loss may happen when the user takes the device 104 deep inside a building. Signal loss may also happen as part of a deliberate strategy to shut down portions of the circuit 106 for short periods to save power.

During periods of signal-loss and/or weak signals Sa-Sn, the circuit 124 generally assures that an accurate timing reference is maintained. For example, under weak signal conditions, the circuit 108 may integrate over multiple navigation data bits (e.g., multiple 20 millisecond periods) and use data wipe-off to allow coherent integration. Knowledge of how good or bad the local time base/reference frequency actually is generally provides an upper bound on the number of pseudo-random noise spreading chips to be searched in order to reacquire the GPS signals.

When the signal conditions improve and/or return to normal, the circuit 120 may rapidly reacquire a new phase-lock to the GPS signals by accurately knowing the elapsed time since the last phase-lock time fix, and both the absolute error and the estimated drift error of the local frequency reference. In such a case, the new positions of the satellites 102a-102n, the Doppler shifts and the positions in the pseudo-random code sequences may be accurately estimated by the circuit 120. Afterwards, re-acquisition of the satellites 102a-102n may utilize modest calculations and power.

Figure 2:
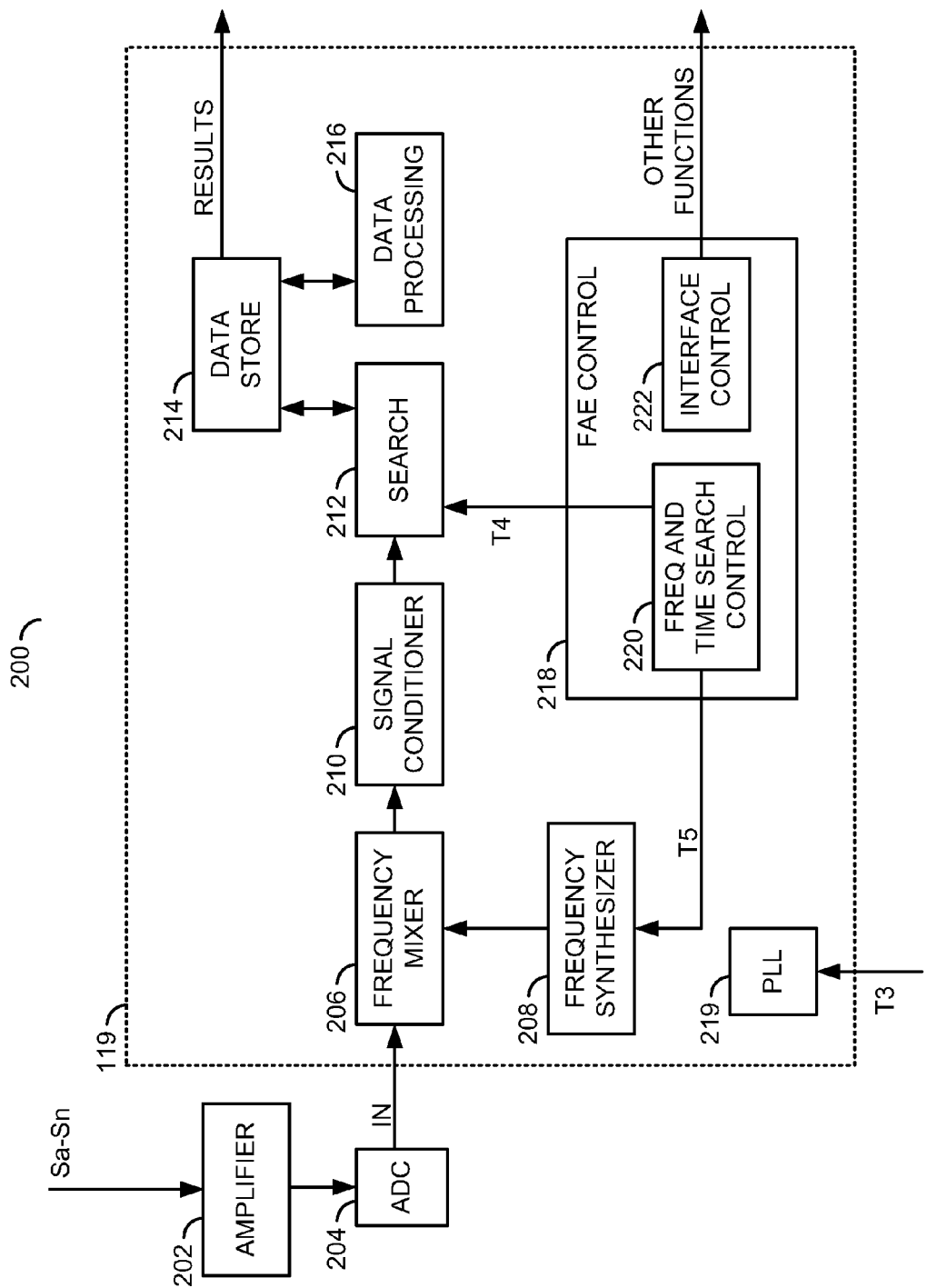
FIG. 2 is a functional block diagram of an example implementation of a fast acquisition architecture.

Referring to FIG. 2, a functional block diagram of an example implementation of the fast acquisition architecture 200 is shown. The architecture (or technique) 200 may be implemented in the receiver 106 and the signal processor 108 of the system 100. The architecture 200 generally comprises a block (or step) 202, a block (or step) 204, a block (or step) 206, a block (or step) 208, a block (or step) 210, a block (or step) 212, a block (or step) 214, a block (or step) 216, a block (or step) 218, a block (or step) 219, a block (or step) 220 and a block (or step) 222. The block 202 may receive the signals Sa-Sn. A signal (e.g., T4) may be generated by the block 218 and presented to the block 212. The block 208 may receive a signal (e.g., T5) from the block 218, which is a fast acquisition engine (FAE) control. The signal RESULTS may be presented from the block 214 to the tracking operations. The block 219 may receive the signal T3.

An objective of the architecture 200 may be to obtain a frequency offset estimation and a time alignment offset per code sequence (also referred to as a "Gold" code (Gi)) in the signals Sa-Sn. Each Gi code sequence generally comprises 1023 coarse/acquisition (C/A) chips. The frequency offsets and the time alignment offsets generally enable searching for any of the satellites 102a-102n that may be detected. For purposes of the present invention, design decisions are generally based around expected correlation characteristics (discrimination) of the Gi codes which may range between 17 dB to 30 dB. The range may be an expected rejection provided from other correlation offsets and codes and often depends on specific environment conditions (e.g., fading, temperature effects, Doppler, etc.).

Timing may provide code alignment of the detected Gi codes to an accuracy of ±½ chip (e.g., 488 nanoseconds). Such a measurement may be based on internal measurements and reference to a local clock reference. Coherent processing and semi-coherent (or non-coherent) processing may be performed in order to improve the power and/or energy measurements on the searched Gi codes on units of the local reference (e.g., 1 millisecond (ms) or 1023 chips). A frequency offset estimation is generally calculated per each detected Gi code to an accuracy of less than ±250 Hz. The accuracy may be improved to around 100 Hz provided extra searching time is allocated to the specific frequency and Gi code combination.

The block 202 may operate as a radio frequency amplifier. The block 202 generally amplifies the signals Sa-Sn prior to digitization. Tuning of the amplification is generally set to receive the L1 frequency at 1575.42 Megahertz (MHz).

The block 204 may perform an analog-to-digital conversion. Sampling may be performed at a nominal 16×1.023 MHz frequency with a bandwidth filtering of 1.4 MHz to 2.2 MHz. A 3-bit signed signal having a range of −3 to 3 may be created by the block 204.

The block 206 may operate as a frequency mixer. The block 206 generally provides a programmable frequency translation to compensate for frequency offsets and Doppler frequency shifts of the signals Sa-Sn. Output signals of the block 206 may include an in-phase (I) component and a quadrature (Q) component.

The block 208 may operate as a frequency synthesizer. Functionality of the block 208 generally includes a numerically controlled oscillator (NCO). The NCO may be used to search in steps of 1 kHz or less over a range of ±40 kHz with respect to the frequency reference of the signals Sa-Sn as controlled by the signal T5. Other step sizes may be implemented to meet the criteria of particular applications.

The block 210 may provide a signal conditioning function. The signal conditioning function generally decimates the digitized satellite data from 16-times over-sampled to 2-times over-sampled. The block 210 may deal with any DC offset on the I-component and the Q-component. The signal conditioning function may also re-sample the digitized data to change the sampling rate to the locally generated reference signal. As part of the re-sampling, a low-pass filter may be included to reject aliasing components and mixing components. Furthermore, the re-sampler function may provide a reference sample signal to drive a search function and/or a code generation function.

The block 212 generally implements a search function. The search function may provide a code search and/or a time search per Gi code up to the 1023 chips (e.g., Gi code length) at 2-times over-sampled per the signal T4. The search may cover a subset or all of 32 codes in order to provide time alignment. Local generation of the codes being sought may be performed as part of the search function. Search results may be stored/accumulated in a memory (e.g., data store block 214). The results may be presented in the signal RESULTS to other functions for detection and/or analysis.

The block 216 may provide general processing functions working on the data stored in the block 214. The processing functions may include, but are not limited to, average power measurements, a local maximum filter, peak selection and symbol boundary detection.

The block 218 may provide overall control of the searching. The signals T4 and T5 may be generated and presented from the block 218. The block 218 generally comprises the blocks 220 and 222. The block 220 may control the frequency and time searches. The block 222 generally provides interfaces within the acquisition function and also provides a local time reference for interfacing with the tracking operations and higher related functions.

The block 219 may implement a phase locked loop (PLL). The block 219 is generally operational to increase the frequency of the signal T3 (e.g., increase by a factor of 4) for internal use by the acquisition engine 119. Other frequency increases may be implemented to meet the criteria of a particular application.

A goal of the present invention may be to maintain low power consumption for a complete solution that includes the tracking engine and protocol stack that supports the GPS functions. To achieve this goal, an implementation may use the same hardware to perform multiple searches in time. Therefore, the implementation of the hardware may be modular to achieve an average predetermined acquisition time. An approach that reuses the same hardware may perform, in as much as possible, back-to-back searches. A maximum delay of up to 180 ms (symbol-2 ms) may be tolerated between searches.

The real time consumed while performing multiple search procedures consecutively is generally determined by (i) an average frequency step (e.g., 80 kHz window=80 steps, 1 kHz window typical), (ii) a search window (e.g., 1 ms coherent window at 1023 chips per Gi code), (iii) a number (e.g., N) of averaging windows, both coherent and/or semi-coherent accumulations (e.g., 4 ms to 160 ms, typically 80 ms), (iv) a typical time per code (e.g., 80 frequency steps/window×80 windows×1 ms=6.4 seconds) and (v) a number of Gi codes searched (e.g., 32 maximum, typically 24). The time consumed may be approximately 2.5 minutes (e.g., 24 codes×6.4 seconds/code=153.6 seconds). The estimations are generally based on the performance of the codes under different frequency offsets and various expected channels scenarios.

The device 104 may capture satellite data into memory and then process the stored data. An advantage of the instant technique may be that the radio receiver 106 is not on all the time in exchange for the power to read data from the memory. Minimum power calculations may be as follows. Statistically, if the captured data contains statistical events, a higher average number of false detections may result in longer search times.

The amount of real time data captured for the search operation may be based on an 80 ms capture window at 16-time over-sampled data. As such, storing the captured data may consume 491 Kilobytes (kB) of memory (e.g., 3 bits/sample× 16 samples/chip×1023 chips/code×80 codes (windows)=3, 928,320 bits). A minimum power for a first-in-first-out (FIFO) type memory may be approximately 48×1.023 megasamples per second (Msps)×2 Watts/second (e.g., a 3 bit bus running at 16×1.023 Msps). If the data was to be decimated first before storage, the total memory consumed may be reduced to 207 kB (e.g., 5 bits/sample×2 samples/chip×2 channels/sample (e.g., an I-channel and a Q-channel)×1023 chips/code×80 codes (windows)=1,636,800 bits). Therefore, the power consumed by the FIFO operation may be reduced to approximately 20×1.023 Msps×Z W/s (e.g., 10 bit bus running at 2×1.023 Msps). In addition to the above memory criteria, all search results should remain in memory until analyzed and then reduced only after a final evaluation of all code offsets.

A hardware implementation of the search operation may be (i) a single search engine or (ii) several search engines instantiated in parallel. The hardware may have a modular configuration with an aim to reduce the probability of false detections, particularly when considering the effects of searching over the expected frequency offset range.

The time reference considered is generally an average time as one problem is to find the first satellite $102a$-$102n$ from a cold start. The corresponding signals Sa-Sn may result in smaller frequency steps for the first search as compared with subsequent searches. However, once a first satellite detection is achieved, the search space in the frequency dimension may be significantly reduced to approximately ±5 kHz, which represents one-eighth (⅛) of the search space after the first detection. The above scenario generally repeats with each new signal Sa-Sn detected, but with smaller reductions in the search space. As such, the initial calculation may be a valid average.

Different software control techniques may be used to implement the complete search using the same hardware. The search procedure will generally result in different processing times with lower average time and may reduce the use of extra hardware (e.g., multiple instantiations). Knowledge of the estimated temperature of a local crystal may be helpful in reducing the search time. Crystal temperature information may reduce the initial search frequency window width as the temperature measurement generally has a 5° C. uncertainty range. The uncertainty range may translate to ±2.5 parts per million (ppm), which translates to ±4 kHz. Therefore, the current crystal temperature value should be considered in order to seed the initial search. The crystal temperature value may also help to detect cases where no visible signals Sa-Sn are available in order to reduce the power consumption. In such cases, the procedure may basically stop searching to conserve power.

Figure 3:
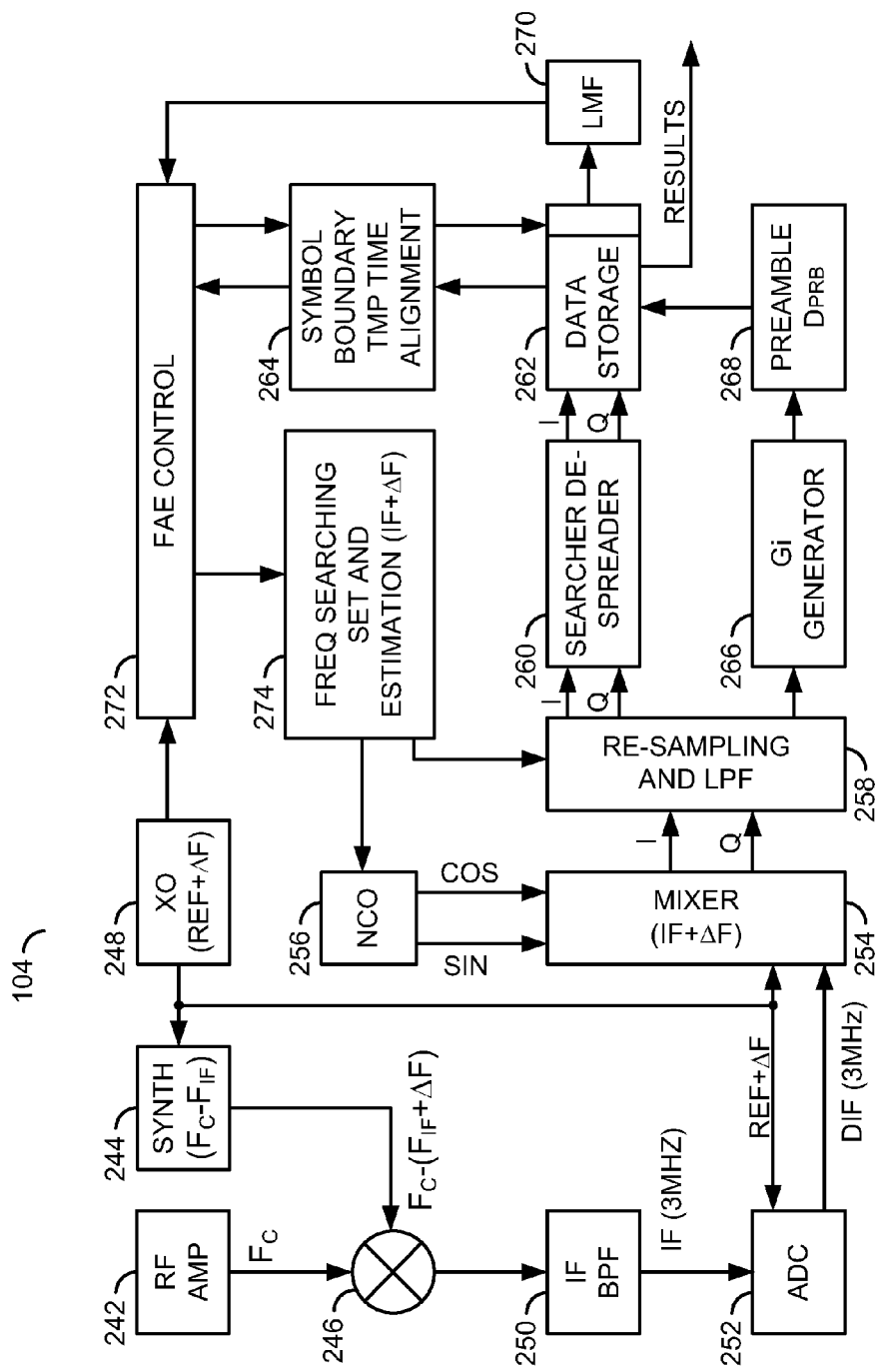
FIG. 3 is a detailed block diagram of an example implementation of a portion of the device shown in FIG. 1.

Referring to FIG. 3, a detailed block diagram of an example implementation of a portion of the device 104 is shown. The device 104 may implement the fast acquisition architecture 200. The device 104 generally comprises a circuit (or module) 242, a circuit (or module) 244, a circuit (or module) 246, a circuit (or module) 248, a circuit (or module) 250, a circuit (or module) 252, a circuit (or module) 254, a circuit (or module) 256, a circuit (or module) 258, a circuit (or module) 260, a circuit (or module) 262, a circuit (or module) 264, a circuit (or module) 266, a circuit (or module) 268, a circuit (or module) 270, a circuit (or module) 272 and a circuit (or module) 274.

Performance of correlators in the search engine may be influenced directly by the frequency offset and the sampling rate. Therefore, a fast acquisition design solution implementing the present invention is generally developed with compensation for the external crystal oscillator reference. The crystal oscillator is generally not a regulated source as the system design constraints are generally based on cost and power saving features. The crystal oscillator frequency offset generally impacts the frequency calculations and the sampling frequency of the digital baseband. The system is constrained by the parts per million (ppm) deviation specified by the crystal oscillator device.

The received signals Sa-Sn are generally mixed down with a nominal frequency (e.g., $F_{IF(e)}$) plus a frequency offset (e.g., $\Delta F_{LOCAL}$) due to the crystal oscillator accuracy. A goal may be to locate the mixed down signal lower than a nominal target, with enough space to cover the expected ±20 ppm range of the crystal oscillator reference (e.g., 16×1.023 MHz).

The device 104 may enable sufficiently large coherent integration cycles by means of controlling the sampling position due to the frequency offset. The integrations may be achieved mainly by introducing a re-sampler in the biased sampled path. Also the implementation may discard samples in some specific cases where complicated control hardware may be implemented. An aim may be to collect as much code energy in the vicinity of the selected frequency offset and thus semi-coherent accumulations may be implemented.

The circuit 242 generally implements an RF amplifier. The circuit 242 may receive the signals Sa-Sn. The circuit 242 may be operational to perform the operations of the block 202. A radio frequency signal (e.g., $F_C$) may be generated by the circuit 242.

The circuit 244 may be implemented as a frequency synthesizer. The circuit 244 may be a portion of the circuit 124 and generally implements the block 208. A signal (e.g., $F_C-(F_{IF}+\Delta F)$) may be generated by the circuit 244, as driven by a reference signal (e.g., REF+ΔF)

The circuit 246 generally implements a mixer. The circuit 246 may be operational to mix the signal $F_C$ with the signal $F_C-(F_{IF}+\Delta F)$ to create an intermediate frequency signal (e.g., IF=$F_{IF}+\Delta F$). The signal IF may be centered at a frequency of approximately 3 MHz. Other intermediate frequencies may be implemented to meet the criteria of a particular application.

The circuit 248 generally implements a local crystal oscillator. The circuit 248 is generally operational to generate the signal REF+ΔF. The signal REF+ΔF may be presented to the circuit 244, the circuit 252 and the circuit 254.

The circuit 250 may be implemented as an IF bandpass filter (BPF). The circuit 250 is generally operational to filter the signal IF.

The circuit 252 may implement an analog-to-digital converter. The circuit 252 is generally operational as the block 204 to digitize the signal IF. The digital signal generated by the circuit 252 may be a 16-times over-sampled signal. Therefore, the digital signal may be essentially a sampled signal with a rate of 2 samples per chip.

The circuit 254 generally implements a mixer. The circuit 254 may be operational to perform the frequency mixing per the block 206. The circuit generally shifts down the oversampled signal IF to a baseband signal having two channels (e.g., I, Q). The circuit 254 may apply a corrected rotation generated in the circuit 256 and applied to a digital complex mixer.

The circuit 256 may implement a numerically controlled oscillator. The circuit 256 is generally operational to create a dual-phase reference signal (e.g., sine and cosine) to drive the circuit 254. The reference signal may be a nominal 16×1023 MHZ clock. Control of the clock frequency may come from the circuit 274.

The circuit 258 generally implements a re-sampler circuit. The circuit 258 may be operational to re-sample and low-pass filter (LPF) the signals generated by the circuit 254. The circuit 258 may implement the function of the block 210. Re-sampling may reduce the 16-times over-sampled signals to 2-times over-sampled signals. An output rate of the circuit 258 may drive Gi code generation for a de-correlation procedure. The circuit 258 may vary an output rate according to the frequency correction under consideration.

The device 104 is generally over-sampled by at least the frequency $\Delta F_{LOCAL}$ making the ratio between the local clock reference and the effective sampled signal convenient for implementation. In particular, corrections to the clocks may be limited to a single direction for the searching procedures.

The circuit 260 generally implements a combination searcher/de-spreader. The circuit 260 may be operational to search for the Gi codes per the block 212. In particular, the re-sampled signals from the circuit 258 may be de-correlated by the Gi codes aligned to the re-sampling output rate in a match filtered searcher structure. The search window may be as small as 16 chips and up to 1023 chips in length running at 2-times over-sampled. The output signals generated by the circuit 260 may provide the Gi code time (cycle) referenced to a resolution of one-half chip. A minimum length for the coherent integration may be 1 ms (e.g., 1023 chips).

The circuit 260 may also perform semi-coherent integrations. The semi-coherent integrations may be based on the non-coherent integration of multiple 1 ms de-correlated signals. A coherent integration period may be around 4 ms to avoid degradation of the semi-coherent results due to frequency offset and different sampling rate.

The search is generally guided by continued measurements of the average energy levels. The data processing part of the searching function may include symbol boundary detection per the block 216. The symbol boundary detection may be a recursive procedure on the initial search. For the initial search, no energy or time offset references or estimations may be utilized.

The symbol boundary detection is generally used to detect preambles in the telemetry words by using the same hardware used to search for the symbol boundaries and reusing the search results data storage area in the circuit 262.

Several different implementations of the circuit 258 are generally available. The implementations may include, but are not limited to a poly-phase finite impulse response filter and a Farrow topology. Tradeoffs between the implementations are generally related to a driving parameter as the number of coefficients due to the ratio between the sampled and the processed signal is similar.

Figure 4:
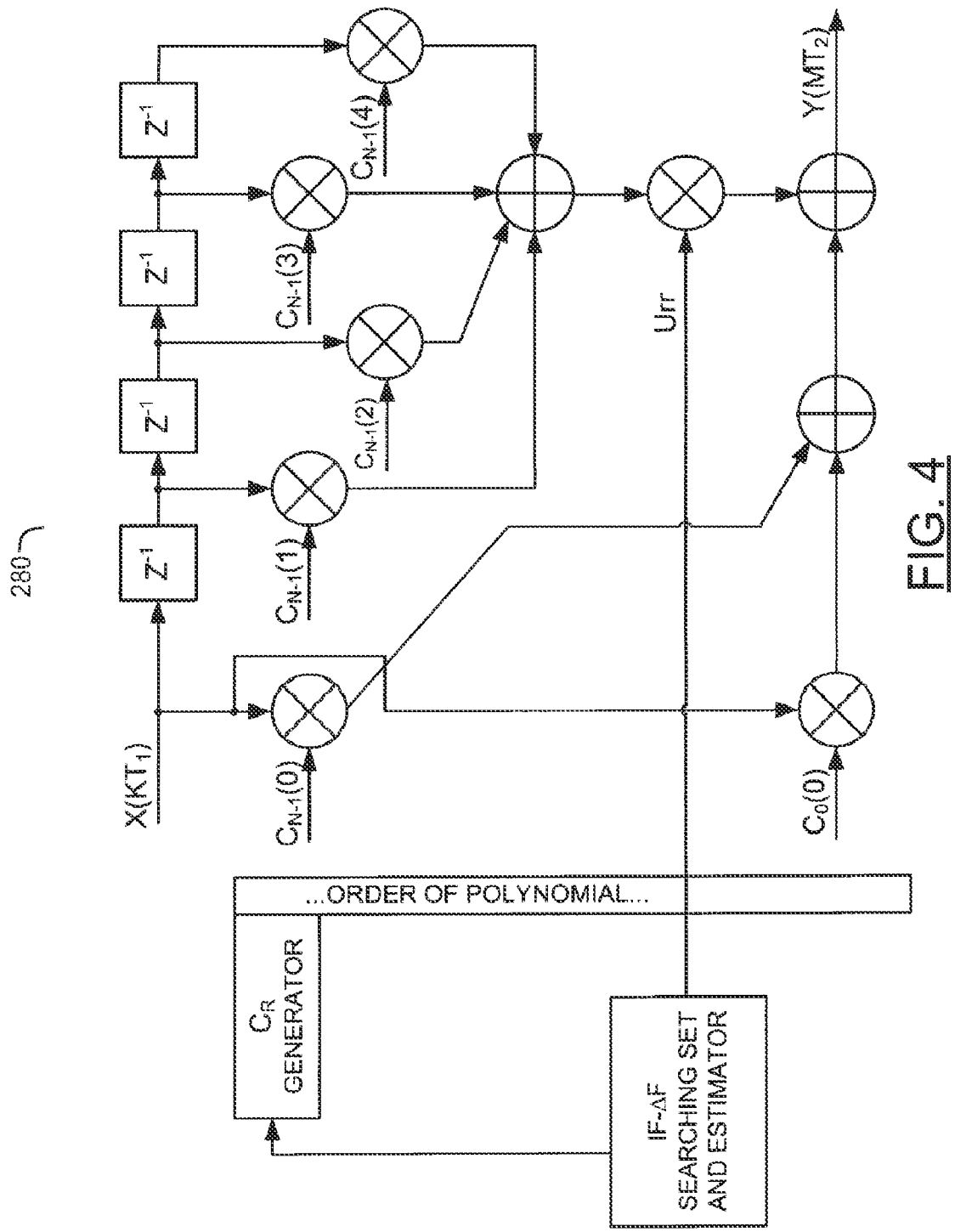
FIG. 4 is a functional block diagram of an example Farrow implementation of a re-sampling function.

The re-sampling function may be used to implement fine re-sampling ratios due to the nature of the frequency offsets. The input rate and output rate are an average 8-times over-sampled signal. Therefore, the Farrow implementation may provide a finer resolution ratio. A Farrow structure having polynomials between 4 and 6 taps may provide an acceptable performance. Referring to FIG. 4, a functional block diagram 280 of an example Farrow implementation of a re-sampling function is shown.

Anti-aliasing is generally considered as a complement to the criteria for a low-pass filter. Anti-aliasing may be achieved in a poly phase re-sampling filter by appropriate selection of the filtering coefficients. A practical implementation of the Farrow operation may partially generate the coefficients on-the-fly as a large set of frequency offsets to be tested generally exist. Referring to FIG. 5, a Table I illustrating chip sliding as a function of frequency offset is shown.

Returning to FIG. 3, the circuit 262 may implement a data store memory. The circuit 262 may be operational to store the various search results created by the circuit 260 per the function of the block 214. The signal RESULTS may be extracted from the data stored in the circuit 262.

The circuit 264 may be implemented as an alignment circuit. The circuit 264 may be operational to provide symbol boundary time alignment.

The circuit 266 generally implements a code generator. The circuit 266 may be operational to generate the Gi codes used by the circuit 260 while searching.

The circuit 268 may implement a preamble generator. The circuit 268 may be operational to generate a duplicate of the satellite preamble to allow data wipe-off during the preamble field of the GPS navigation message (as defined in "Navstar GPS Space Segment/Navigation User Interfaces", Interface Specification IS-GPS-200, Revision D, 7 Dec. 2004).

The circuit 270 generally implements a local maximum filter (LMF). The circuit 270 may be operational to generate feedback information to the circuit 272 based on the search results stored in the circuit 262.

The circuit 272 generally implements a fast acquisition engine (FAE) controller. The circuit 272 may be operational to provide overall control of the searching operation per the function of the block 218.

The circuit 274 may implement a search control circuit. The circuit 274 may be operational to control the frequency and time searches per the block 220. The fast acquisition technique generally performs searching in the time domain (e.g., code offset) for a given fixed frequency offset. The searching may be performed at two samples per chip for every frequency offset attempted. The device 104 may search in several modes: a blind search mode, a re-acquisition search mode and a symbol boundary detection mode.

The blind search mode (or initial search mode) is generally an initial search mode without any guide or reference provided to the searcher. Searching in the blind search mode may change slightly to provide optimization on the search time and reduce power consumption.

The re-acquisition search mode generally makes partial use of the fast acquisition hardware in order to re-acquire frequency or time (code) lock making use of known parameters from the initial search or from data originating from the tracking engine 120.

Parameters for a searcher design are generally tradeoffs amongst time of searching, power and memory. A simplified version of the design parameters may include:

Time=Window size+(Gi length−Window size)×kt, where kt may be a resetting time for repeat offset and calculation to hold the reduced state.

Memory=(Window size/Gi code length)+Hold memory 32 chips equivalent.

Power=(Time×kp×(Window size/Gi code length)×1023 Msps×1023)+(narrow search), where kp may be an operation cycle power (e.g., 0.0125 micro watts).

The above generally imply that the trade-off is mainly between time and memory due to the blind search mode.

The blind search mode is generally the full search mode of the device 104. The blind search mode may use all of the hardware resources to find candidates with good peak-to-mean power/energy from the whole search space. Tuning of the search in the frequency domain may be coarse. The code energy is expected to be scattered around a possible code offset at a given frequency setting. The following are the parameters defined to work with the expected behavior.

The coherent integration length and the semi-coherent integration length initially may be limited until there is symbol boundary detection. Until such event happens, the symbol boundary detection may run continuously in the background.

The search window is generally 1023 chips in length. The search window parameter value is mainly due to the transmission time of a Gi code (e.g., 1 ms).

An initial step for the initial search mode may be to cycle through all the frequency offset steps and to post process the results stored in memory (e.g., the circuit 262).

As frequency offsets and code offsets are unknown, the energy collected in the output of the search may be spread over a range of samples that depend on the closeness of the frequency hypothesis. An aim of the full search may be to collect enough data to focus the search on possible good candidates. A decision may be made taking in account (i) the energy/power results from the search, electrical power (e.g., battery) and time (e.g., duty-cycle) to make another search or (ii) until a peak is detected that satisfies a given threshold.

A second step of the search may occur when a good candidate has been selected. The fast acquisition technique control generally narrows the search in the frequency vicinity to decide if the candidate signal is good enough to be considered for the tracking mode. Multiple searches (codes) with the same frequency offset may be conducted in the blind search mode.

Searching in the second step may attempt to use a smaller search window than in the initial step. The closing of the window may be used for the specific candidate from the initial step. The ability to power down portions of the search hardware during the re-acquisition search mode may result in a significant power saving.

The re-acquisition search mode is generally a smaller version of the second step of the blind search mode. The re-acquisition search mode may provide a fast and low-power reference for the tracking engine 120. The frequency window and the time offset window size may be small in the re-acquisition search mode. The re-acquisition search mode generally operates under an assumption that the signals have not drifted far from the last good known measurement (duty-cycle dependent). Furthermore, the search may be limited to a few (e.g., 4) Gi codes over small (e.g., 32 chip) windows.

Symbol boundary detection in the symbol boundary search mode may work only with the top energy measurements. The symbol boundary detection may be done by creating two artificial symbols and comparing the energy of the created symbols to determine if a transition has occurred. The artificial symbols may be created with different numbers of Gi code lengths. The results may be more reliable when a signal-to-noise (S/N) ratio is favorable so the results may be considered by the average power measurements.

The symbol boundary search may be applied to a subset of selected time offsets (hypothesis) processed by the local maximum filter 270. The filter function may operate with up to 40 Gi code lengths. The boundary detection may not be achieved directly from the correlation function but from a small search function looking for the symbol boundary. The small search function may be able to operate while the main search function is performing a search in a specific frequency offset hypothesis.

The symbol boundary detection mode is generally used to acquire the symbol boundaries after the frequency offsets have been estimated to an accuracy of around 150 Hz by repeated smaller steps of frequency search. The symbol boundary detection mode may also be extended to search for the telemetry words, where appropriate.

A total output of the search function at 2 samples per chip generally establishes a minimum storage capacity based on frequency. The memory storage may be at least 13 bits/sample×2 samples/chip (I,Q)×1023 offsets×2 over-sampled per frequency search=53,196 bits per frequency/code hypothesis.

The frequency search generally provides acceptable energy values for signals with a small frequency offset (e.g., less than ±200 Hz) around the selected frequency offset hypothesis. The theoretical energy levels expected may be influenced by the coherent integration length. For a matching frequency hypothesis, large coherent accumulations (e.g., 20 ms or more) may provide large improvements of the absolute energy/power detected and also of the peak-to-mean values out of the searcher.

Figure 6:
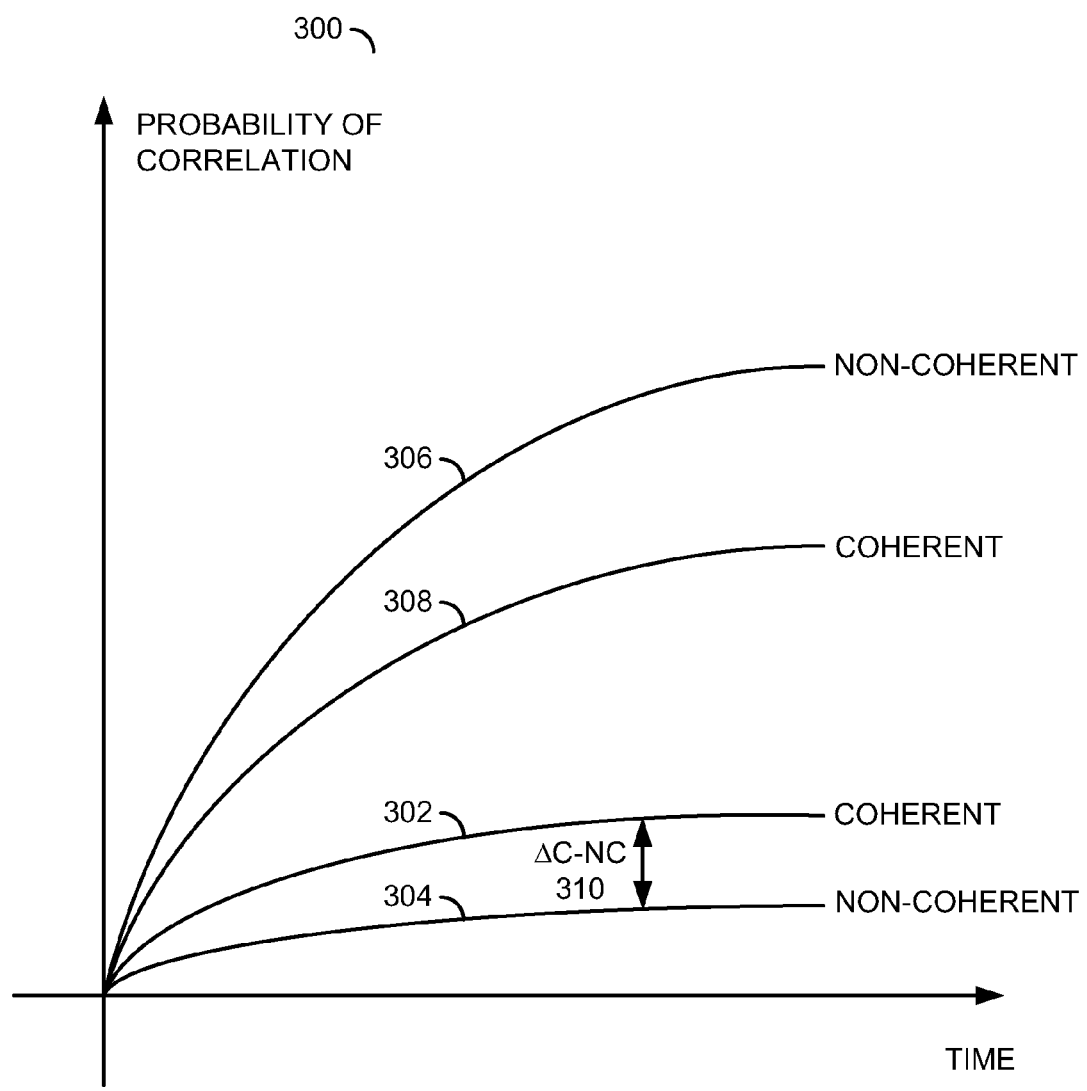
FIG. 6 is a graph illustrating example integrations.

Referring to FIG. 6, a graph 300 illustrating example integrations is shown. The graph 300 generally plots a probability of correlation (Y-axis) as a function of integration time (X-axis). For weak signals, coherent integration (curve 302) is generally better than non-coherent integration (curve 304). For strong signals, the non-coherent integration (curve 306) generally provides better results than coherent integration (curve 308). A difference between the coherent integration and the non-coherent integration (difference 310) may provide an estimation of the signal strength.

The processing of coherent and semi-coherent results during the search may utilize a second memory capacity the same size as the initial storage capacity. The second memory capacity may be used in different modes specially to provide improvement on the frequency offset estimation aided by the different performances of the semi-coherent and coherent results.

However, for a typical mismatch of up to 200 Hz, the coherent accumulations may provide low power levels. Coherent accumulations between 3 ms to 5 ms generally provide some extra energy in the vicinity of the selected frequency. In such a case, the peak-to-mean results of the search due to the frequency offset may degrade after few 1 ms coherent accumulations.

To make use of a larger frequency search window, the semi-coherent accumulations may be implemented with peaks detected every 3 ms to 5 ms. The expected peak-to-mean values are 4 dB lower than a zero Hz reference case. A calibration offset may be added to the expected peak-to-mean value. A local maximum filter may be run to select up to a few (e.g., 3) clusters of peaks. A selection procedure for the clusters may be described below.

For a semi-coherent accumulation, several (e.g., up to 64) peaks and associated addresses may be stored. The memory consumed may be (14 bits×64 peaks)+(11 bits×64 addresses). For semi-coherent accumulations, approximately 1,600 bits per frequency/code hypothesis may be needed.

In addition to maintaining the semi-coherent memory table, a second table of around 3,200 bits may be created. The second table is generally used to store the history of the top I,Q values and to compare updated semi-coherent values maintained in the final table.

The extra memory is generally used under a specific procedure to select the peaks and replace the peaks in the main memory to avoid duplication of the main memory. The procedure to maintain the table is under a stochastic process so the validity provides a good average improvement in collected extra energy of the immediate side band (reference frequency hypothesis). The procedure generally avoids the instantiation of multiple memories the size of the main coherent memory.

In the procedure, and in order to maintain digital growth in the accumulators, scaling may be performed every few milliseconds (e.g., ~4 ms) of accumulation. The scaling may be done in a specific sequence and may be taken into consideration in the final calculation and decision by the fast acquisition technique. The total minimum internal memory capacity may be 2×55,996 bits/frequency/code hypothesis. With the implementation of two interleaving memories, the intermediate results may be increased to select 64 candidates, in order to increase the probability of detection.

Figure 7:
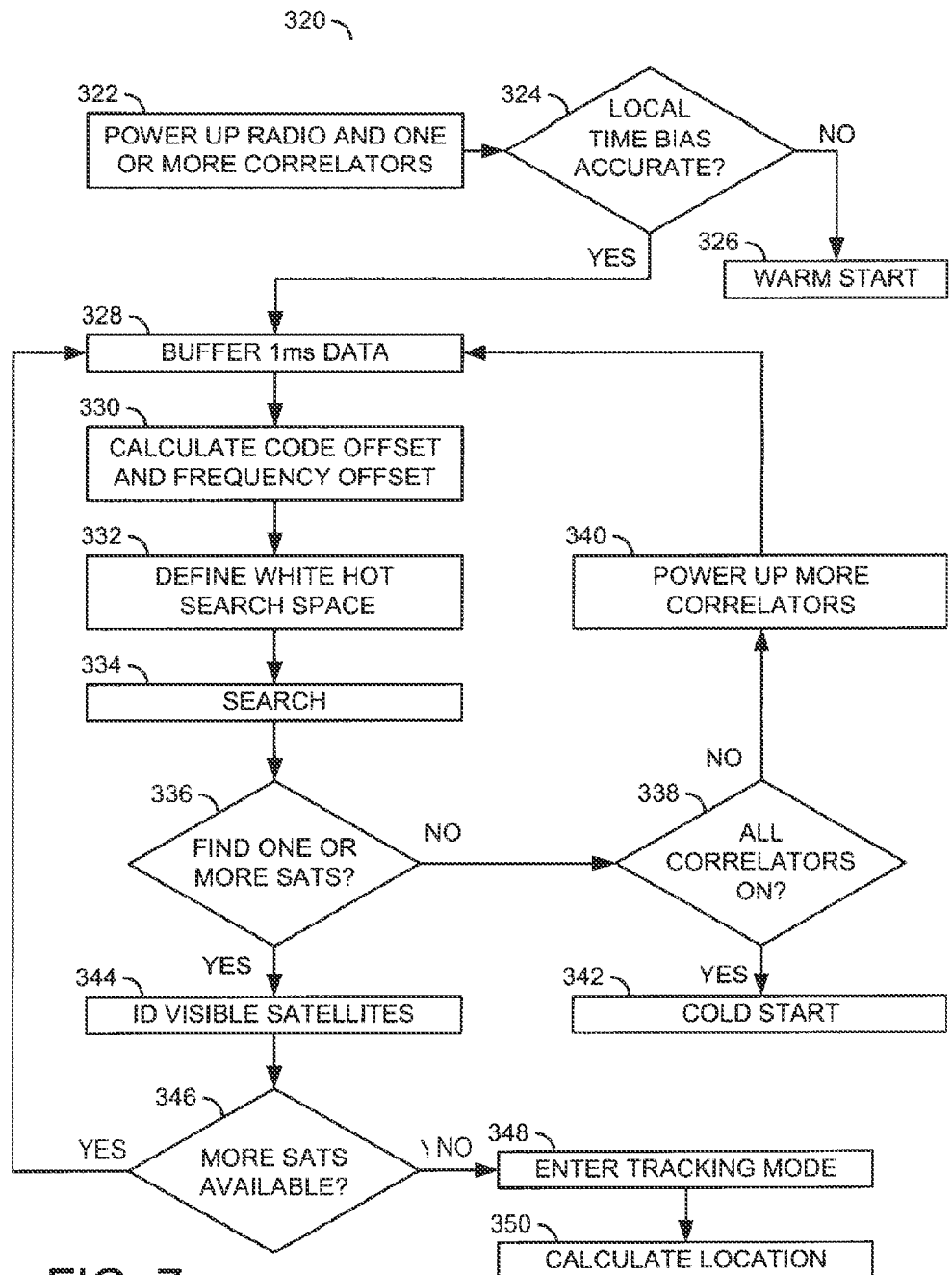
FIG. 7 is a flow diagram of an example implementation of a re-acquisition search method.

Referring to FIG. 7, a flow diagram of an example implementation of a re-acquisition search method 320 is shown. The method (or process) 320 may be implemented by the device 104. The method 320 generally comprises a step (or block) 322, a step (or block) 324, a step (or block) 326, a step (or block) 328, a step (or block) 330, a step (or block) 332, a step (or block) 334, a step (or block) 336, a step (or block) 338, a step (or block) 340, a step (or block) 342, a step (or block) 344, a step (or block) 346, a step (or block) 348 and a step (or block) 350.

The re-acquisition search mode generally utilizes the code generation and the correlation functions. Control may be provided by the circuit 272 in terms of parameters and scheduling. Time alignment and synchronization references may be measured from the input samples received from the circuit 266. The main parameters for the search are generally illustrated in Table II in FIG. 8.

In the step 322, the radio receiver 106 may be powered up to generate the signal IN and one or more correlators may be powered up to begin the search. The local time bias may be checked in the step 324 to determine the accuracy. If the local time bias is not accurate (e.g., the NO branch of step 324), the previous powered-down period may have been too long to perform the re-acquisition search and thus a warm start may be performed in the step 326.

If the local time bias is reasonably accurate (e.g., the YES branch of step 324), an initial period of data from the signal IN may be buffered in the step 328. A frequency offset and a code offset may be calculated for the expected signals Sa-Sn in the step 330. In the step 332, a white hot search area may be defined for the initial search. A white hot search area is generally smaller than a hot search area. Details of a white hot search area may be found in co-pending U.S. patent application Ser. No. 12/039,865.

A search for one or a few (e.g., 4) signals Sa-Sn expected to be in the white hot search may be performed in the step 334. If no signals Sa-Sn are identified in the search (e.g., the NO branch of step 336), a check of the number of correlators powered up may be performed. If all of the correlators are operating (e.g., the YES branch of step 338), the re-acquisition search may be considered unsuccessful and a cold start may be attempted in the step 342. If some of the correlators are still unpowered (e.g., the NO branch of step 338), one or more additional correlators may be powered up in the step 340. Thereafter, new satellite data may be collected in a second time period in the step 328 and the white hot search repeated using the additional correlators to expand the search.

Once at least one signal Sa-Sn has been found (e.g., the YES branch of step 336), an estimation may be made in the step 344 of the satellites 102a-102n that should be in view. If the signals Sa-Sn for some of the satellites 102a-102n that should be in view were missed by the search (e.g., the YES branch of step 346), a new set of data from the satellites 102a-102n may be collected in a new time period in the step 328. Searching may continue until a predetermined limit of the search has been reached or all of the expected signals Sa-Sn have been found (e.g., the NO branch of step 346). Afterwards, the device 104 may enter into a tracking mode in the step 348. From the tracking mode, the location of the device 104 may be reported in the signal OUT in the step 350.

Figure 9:
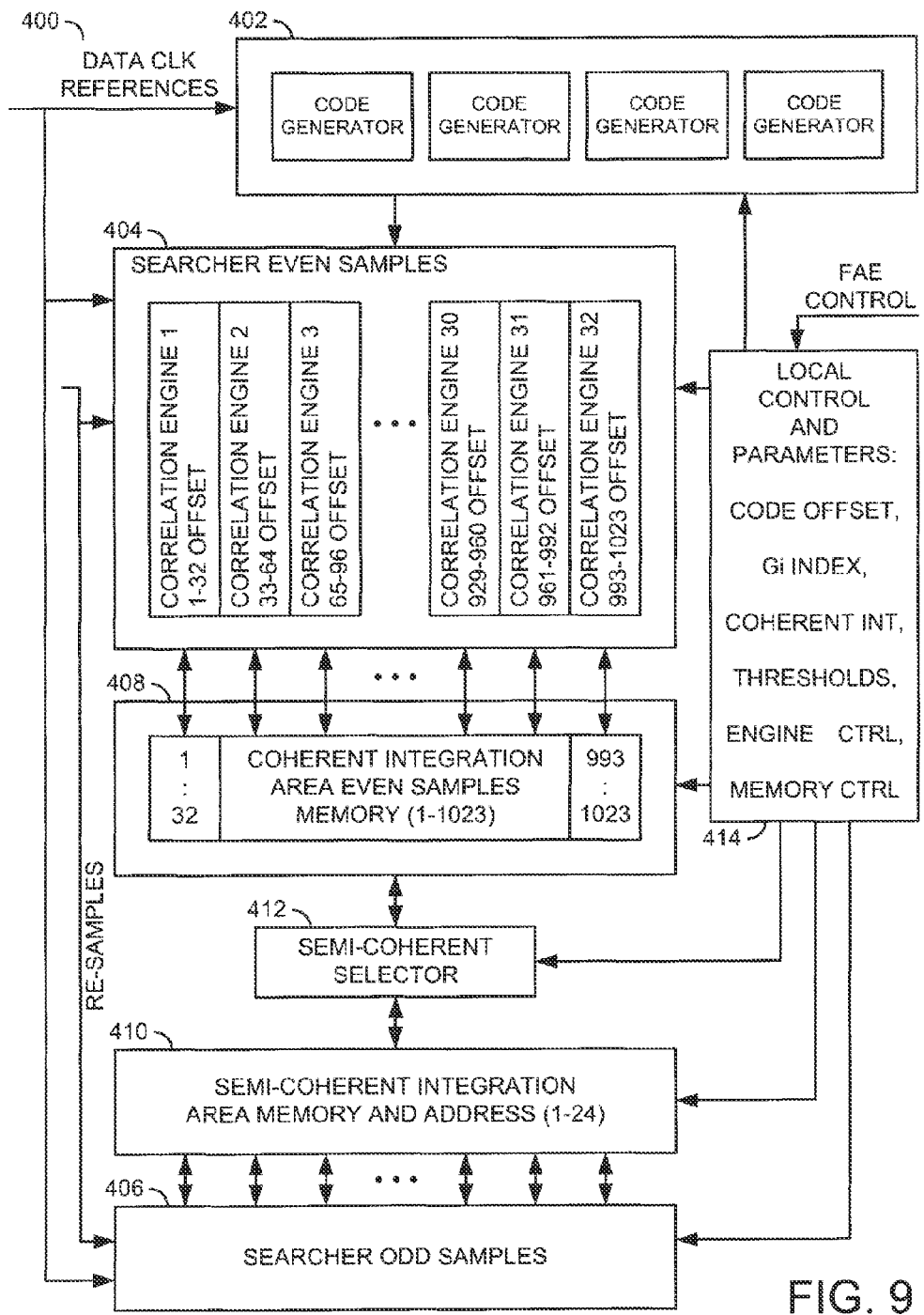
FIG. 9 is a block diagram of an example implementation of a searcher structure.

Referring to FIG. 9, a block diagram of an example implementation of a searcher structure 400 is shown. The structure 400 generally comprises multiple circuits (or modules) 402, multiple circuits (or modules) 404, a circuit (or module) 406, a circuit (or module) 408, a circuit (or module) 410, a circuit (or module) 412 and a circuit (or module) 414. The structure 400 may be implemented in the circuits 260, 262, 264 and 266.

The circuit 402 may implement one or more code generators (e.g., the circuit 266). The circuit 402 may be operational to generate from one to several Gi codes used in the search. At least 4 independent code generators may be provided in the circuit 402. Each of the code generators may be independently programmable with a code offset and a time offset.

Each of the circuits 404 may implement an independent concatenated engine having multiple (e.g., 32) correlators (circuit 260). Each of the correlators may operate on a search window covering a fraction (e.g., 32 chips wide) of the total code length of 1023 chips. The correlators generally work in parallel to achieve a 1023 "even chips" window. The circuits 406 may be similar in design to the circuits 404 and working with 1023 "odd chips" window.

The circuit 408 may be implemented as a memory (circuit 262). The circuit 408 may operate as an integration area for the even samples created by the correlators of the circuit 404. The circuit 410 may also be implemented as a memory (either the same memory as the circuit 408 or a different memory). The circuit 410 may operate as an integration area for the odd samples created by the correlators of the circuit 406.

The circuit 412 may be implemented as a selector. The circuit 412 may be operational to select the integrated samples from the memory 408 and the memory 410.

The circuit 414 generally implements a controller. The circuit 414 may be operational to control the functionality of the structure 400. The circuit 414 may also store several parameters, such as the code offsets, Gi index, coherent integration thresholds, control parameters and memory parameters.

A power saving mode and/or power-down capability may be implemented for each of the circuits 404 and 406 independently. Furthermore, a power saving mode and/or power-down capability may be implemented independently for each of the correlators. Furthermore, the circuit 404 and the circuit 406 may share address decoders and Gi code to simplify the control and reduce the number of control signals. Reporting of search steps, such as scaling and mean power, is generally limited to the main search function.

A search input rate may be nominally 1.023 Msps×2-times over-sampled=2.046 Msps. An output rate may be 1023 chips×2 components/sample (I,Q)×2-times over-sampled× throughput period (typically every 20 ms)=204.6 ksps. An internal throughput rate is 1.023 Msps×1023 offsets×2(even/odd)=2.09 Gops.

The throughput value is a reason to spread the search operation across parallel engines. For example, 32 engines may be running in parallel at $\frac{1}{32}$ of the above mention rate (65.41 Mops). Likewise, the main storage area may be partitioned to enable a corresponding reduction of the access rate.

The memory access rate may be higher than the integration rate from the correlation engines. Therefore, independent addressable blocks of memory may be created to support the post-processing functions (e.g., block 216). The post-processing functions may read and evaluate many (e.g, 2,046) partial accumulations for the semi-coherent integration block. However, because the integrations may occur in the same time frame within the same memory area, the post-processing functions may be interleaved with the normal operations from the search.

Figure 10:
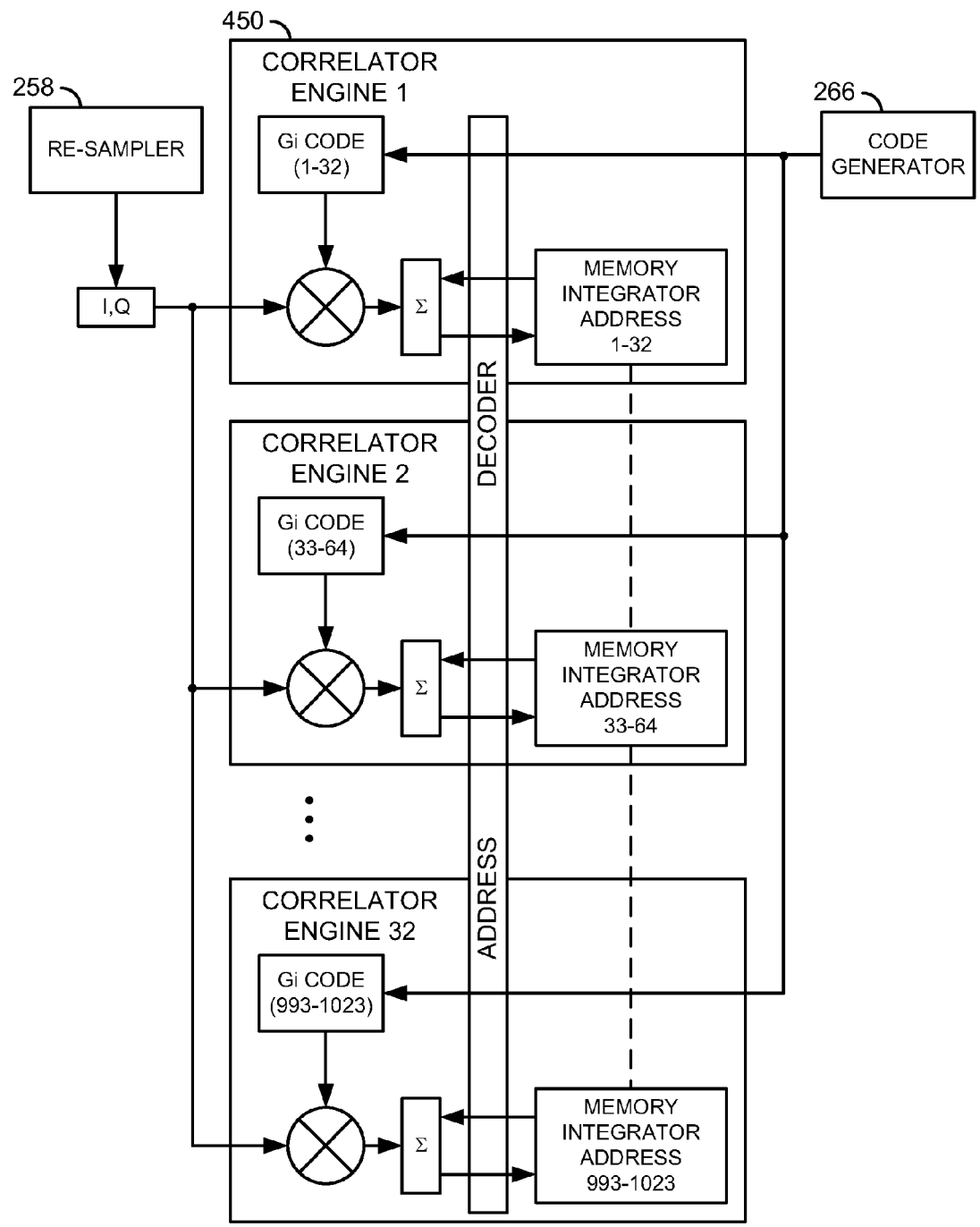
FIG. 10 is a functional block diagram of an example implementation of a correlator engine.

Referring to FIG. 10, a functional block diagram of an example implementation of a correlator engine 450 is shown. In operation, every single chip/sample may be correlated with a different code offset and accumulated directly into memory. Some resulting advantages may be (i) the lack of an adder tree and (ii) that the same chip/sample is correlated with different code offsets.

Figure 11:
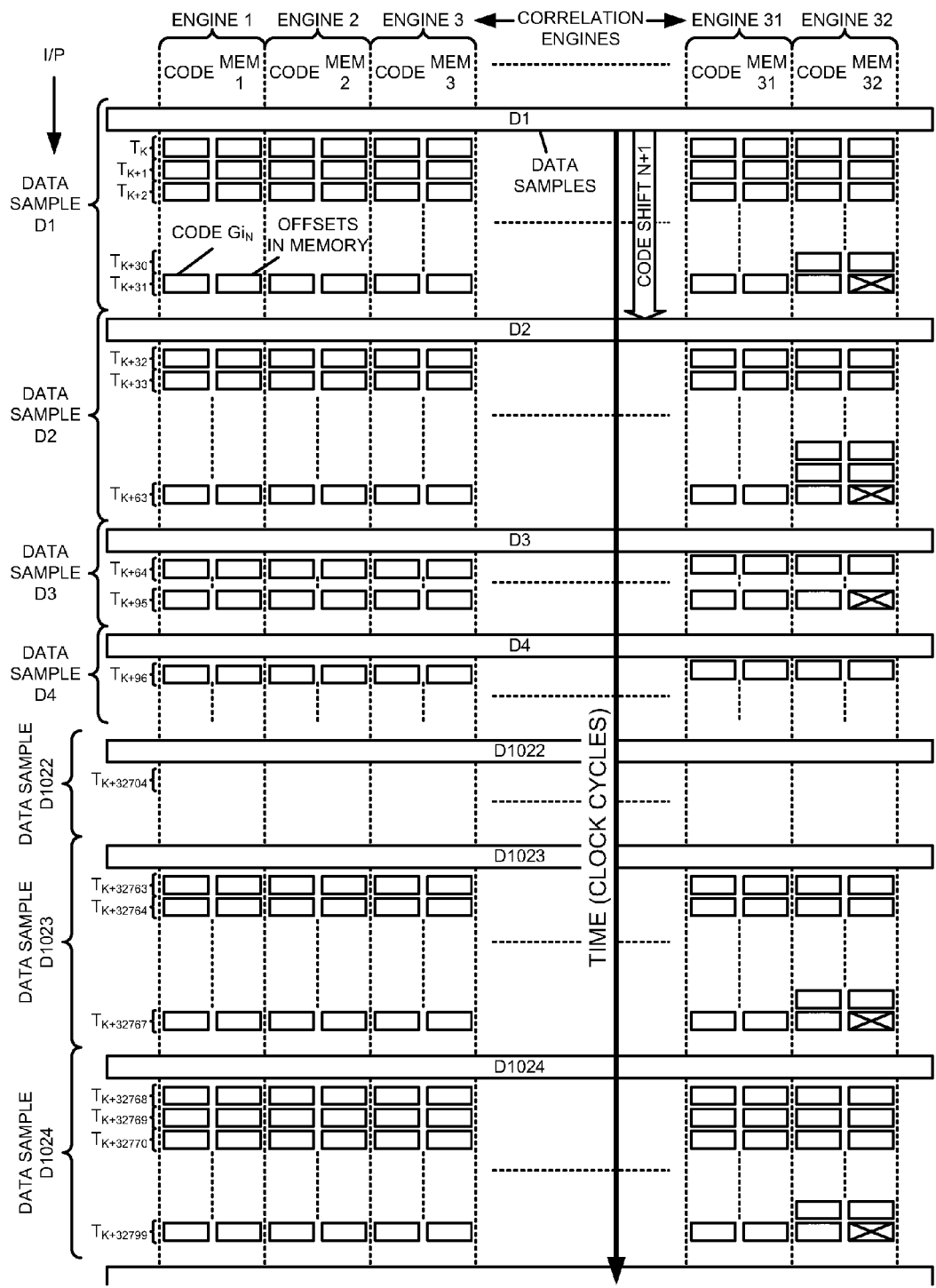
FIG. 11 is a time diagram illustrating an example operation performed on each chip.

Referring to FIG. 11, a time diagram illustrating an example operation performed on each chip is shown. All offsets may be correlated with a different (consecutive) phase of the Gi code and the procedure may be repeated on every new chip with 32 new correlation operations. After the 32 operations, an extra shift of the code may be applied to all the correlation engines in the same way. After processing 1023 chips, every memory location generally has the accumulated correlations of the Gi code length. The correlations may be accumulated per correlation engine in a specific memory.

The cycle generally repeats every Gi code period and the control layer (circuit 414) may be responsible to re-direct the partial results that are produced at 1 ms rate interval. The control layer may also control the length of the coherent integration and the memory interleaving as appropriate.

Figure 12:
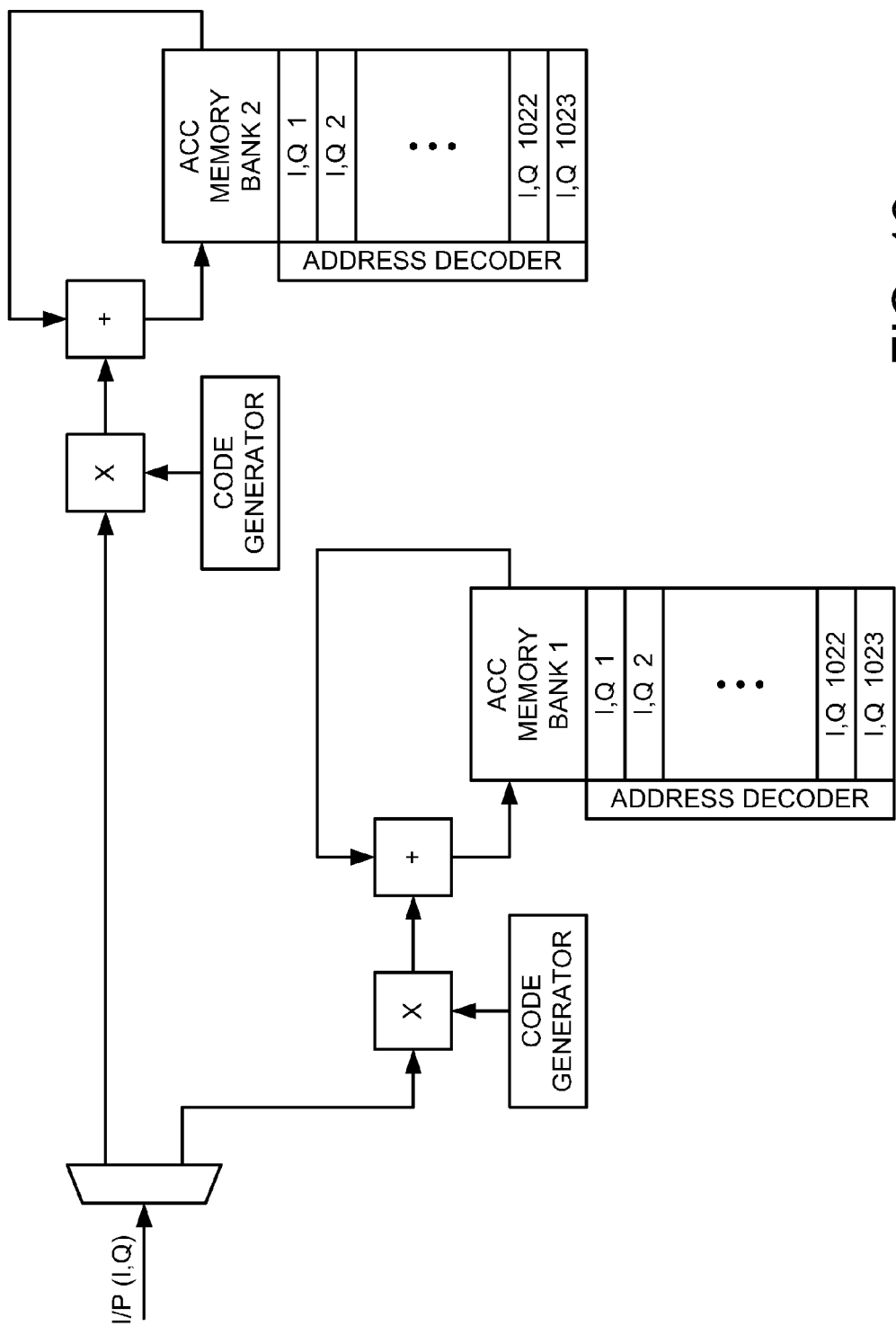
FIG. 12 is a functional block diagram of an example interleaving.

Referring to FIG. 12, a functional block diagram of an example interleaving is shown. The interleaving generally does not control memory interleaving. Instead, the interleaving may control correlation engine interleaving. To support the various control modes, the following functionality may be provided.

A path into the correlator memory may support input interleaving. The interleaving generally enables modes of operation with larger integration periods than if no interleaving takes place. For power saving, the fine control may be applied to individual correlator engines within each of the circuits 404 and 406.

Figure 13:
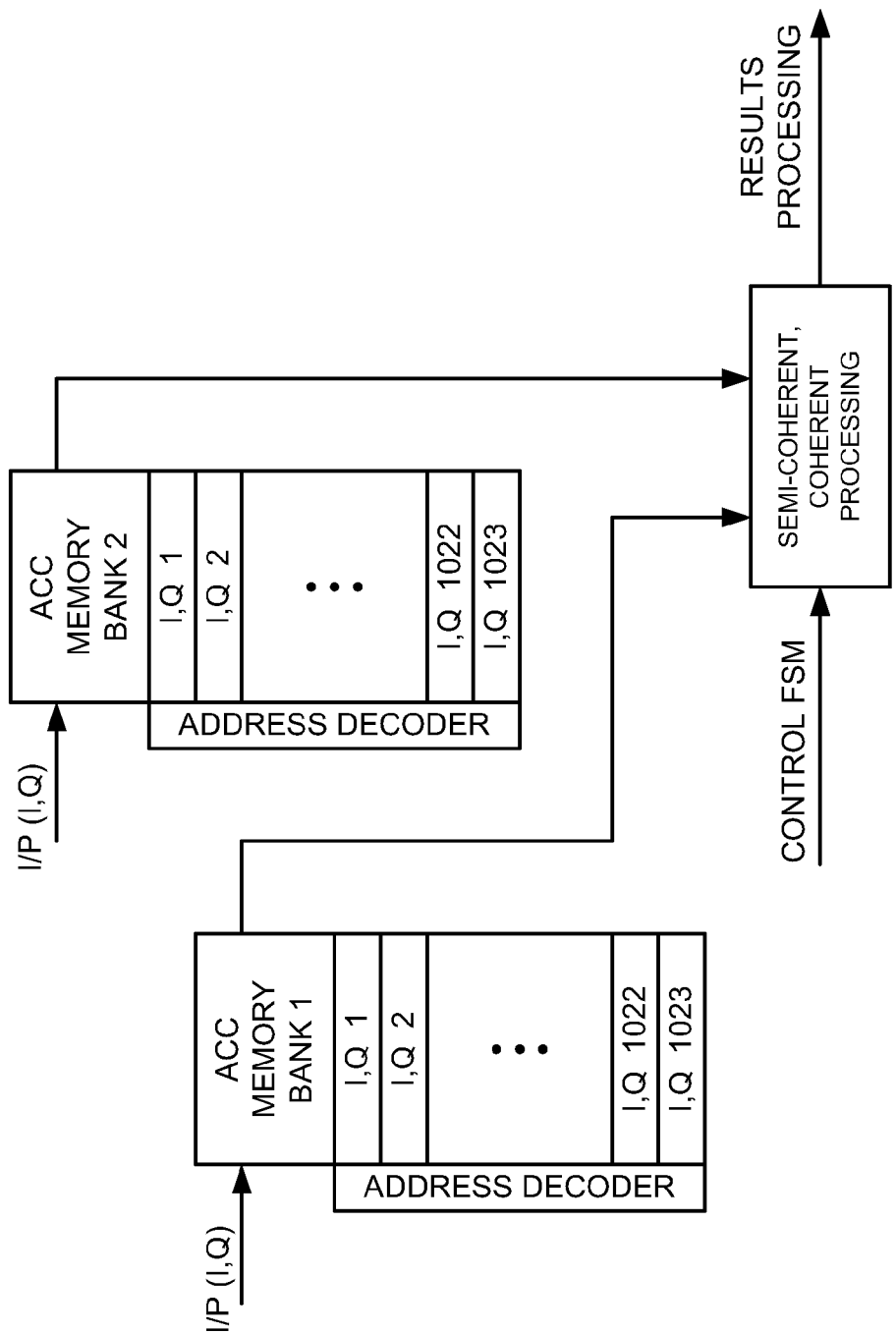
FIG. 13 is a functional block diagram of an example concurrent memory access.

Referring to FIG. 13, a functional block diagram of an example concurrent memory access is shown. Partial search results and final search results may be accessed by different post-processing methods. During the interleaving period, and in order to reduce the load of processing all results in a very small period, the search memory (circuit 262) may be accessible during part of the interleaving. The post-processing procedures may be run on individual search engines at the same time reducing the power consumption of the interleaved memory blocks by a ratio of around 30 to 1. Access to the memory is generally controlled by a local finite state machine as the rates may be associated to an overall rate at which the search operation processes data (~2 Gbps).

Figure 14:
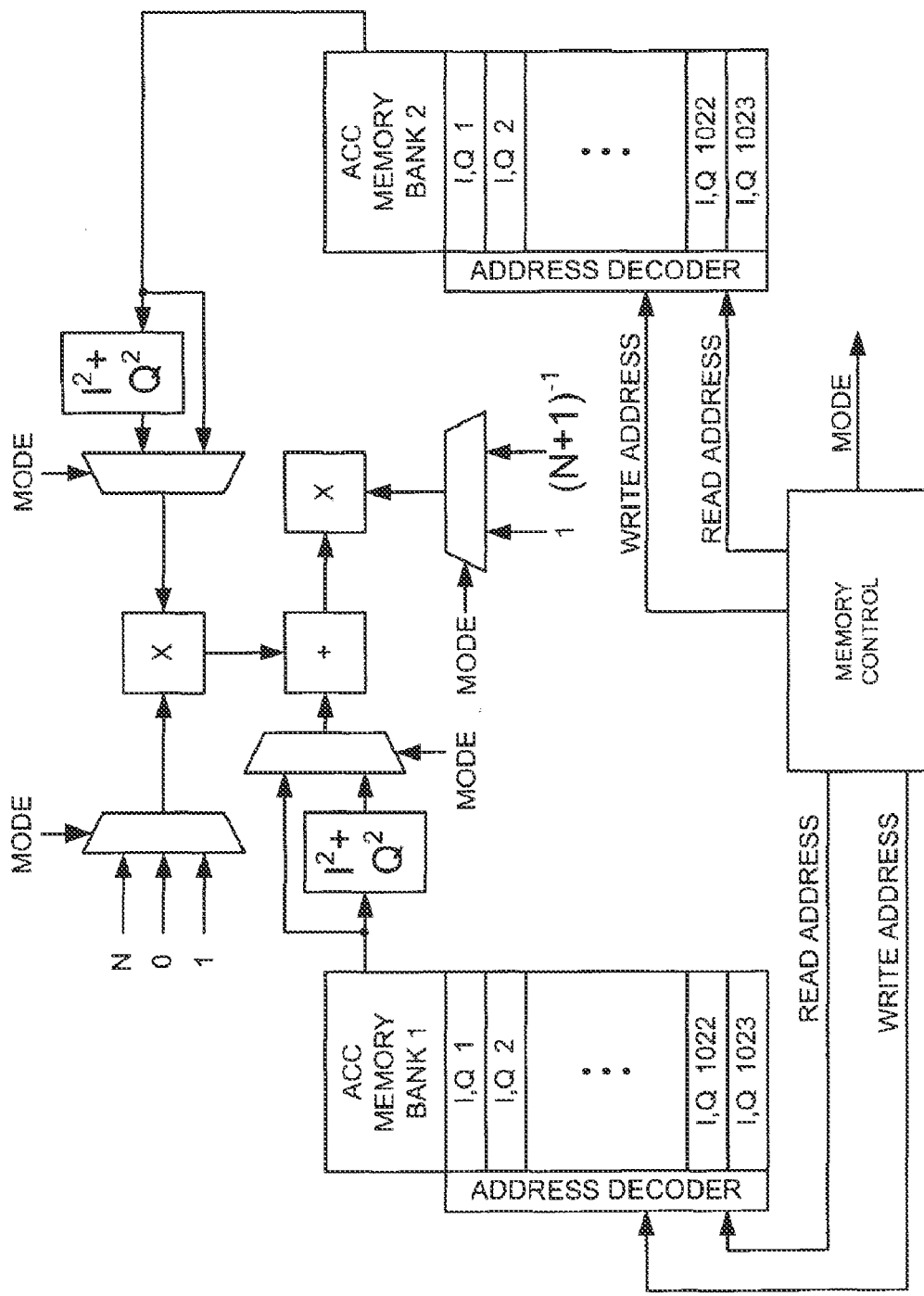
FIG. 14 is a functional block diagram of example method of coherent accumulations and semi-coherent accumulations.

Referring to FIG. 14, a functional block diagram of an example method of coherent accumulations and semi-coherent accumulations is shown. The search generally provides coherent integration results and semi-coherent integration results with variable integration lengths. The search may operate in different modes in order to improve the frequency offset and code offset estimations. Variable integrations windows may be enabled during the search. In conjunction with the concurrent access control finite state machine, the method may enable concurrent semi-coherent results and coherent results for fine frequency searches. Furthermore, the method may also maintain the digital growth to the specified bits (e.g., 13 bits).

Figure 15:
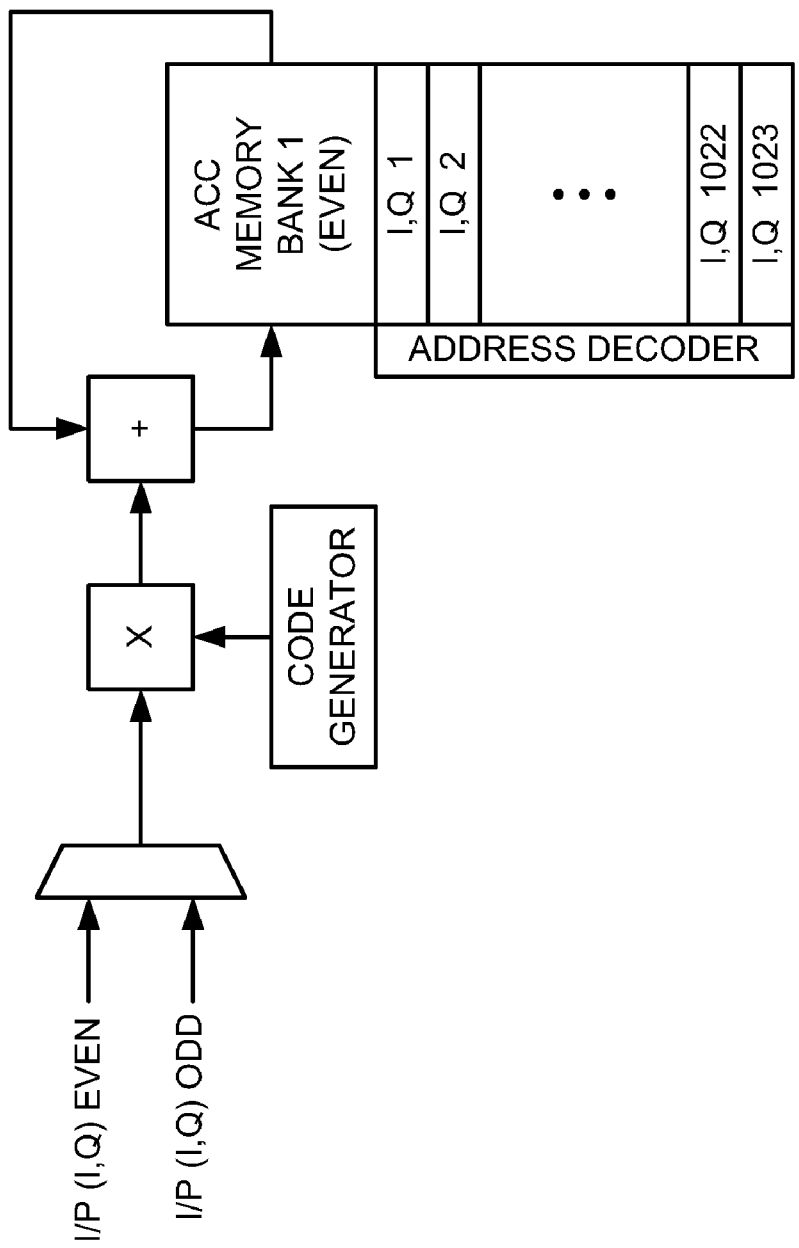
FIG. 15 is a functional block diagram of an example method of input multiplexing.

Referring to FIG. 15, a functional block diagram of an example method of input multiplexing is shown. The input multiplexing operation may apply to the re-acquisition search and to very narrow (e.g., white hot and narrower) window frequency searches. During the re-acquisition search mode, a majority of the circuits 404 and 406 may be powered down as the blind search mode procedures are not executed. In such a case, only a few of the circuits 404 and 406 may be powered up. A total number of the circuits 404 and 406 may be 2 samples (even, odd)×32 engines/samples×2 interleaving banks=128 engines. However, the search may be performed in only 3 engines over an offset window search as small as 16 chips, resulting in a nominal power saving of approximately 97%.

Figure 16:
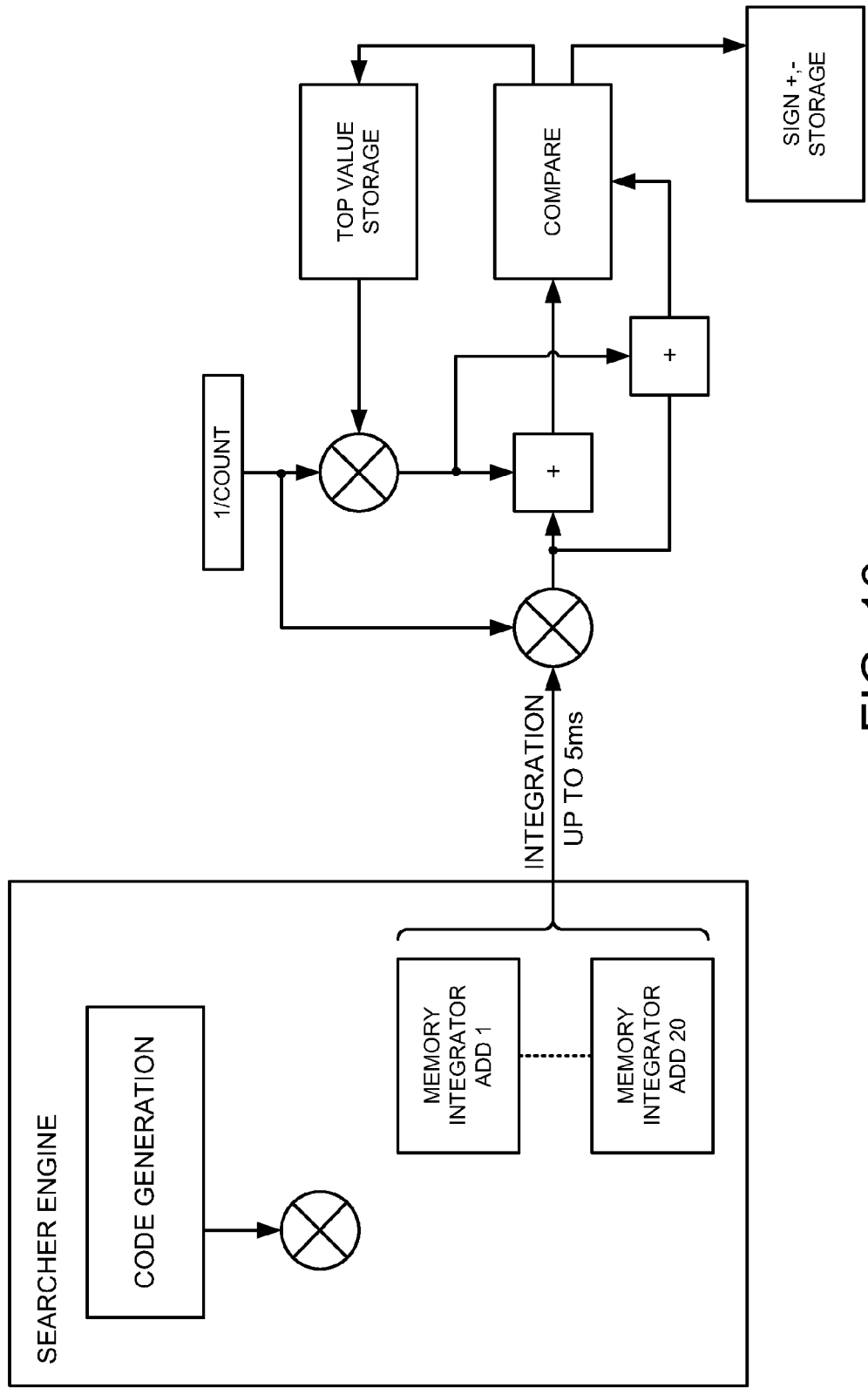
FIG. 16 is a functional block diagram of an example method of symbol boundary pre-frequency estimation.

Symbol boundary detection may be implemented with two different modes: (i) pre-frequency estimation/detection and (ii) post-frequency estimation/detection. Referring to FIG. 16, a functional block diagram of an example method of symbol boundary pre-frequency estimation is shown. In order to process large data coherently, the symbol boundary detection procedure may run in parallel to the main search procedure. The parallel operation may be implemented on the last cycles of every integration period. The early symbol boundary estimation generally provides intermediate estimations that may aid the coherent integration. The boundary estimation solution (i) is generally based on sign changes of the historic values and (ii) stores the latest best value. The output of the symbol boundary estimation may be processed to determine cycles of 20 values. The window size generally moves through the 1 ms boundary in steps (integrations) of up to 5 ms.

For an initial search, a procedure to estimate the location of the symbol boundary is generally helpful and may run on 1 ms coherent results resolution. The initial search may be time consuming, but may provide a reference for larger coherent integrations of weaker signals. Furthermore, the symbol boundary estimation feature may help any subsequent searches.

The search hardware programmed for the blind search mode detection may continue to do coherent integration and semi-coherent integration on the given parameters until externally stopped or reprogrammed on all engines. In the blind search mode, a threshold provided by the circuit 414 should take into account the accumulation length and the scaling steps. Under the blind search mode, every report from the search engines should provide the mean power/energy calculated on all output of the searcher memory before overwriting the memory content. The above may also be the case for the 10 ms semi-coherent data that is delivered at the same time as an extension to the main coherent memory.

For the second stage of searching when a more accurate frequency estimation is commanded, a single search engine should be capable of searching only in the specific 32 chips wide window with the code offset to the center of the engine. Such an operation may be repeated at 500 Hz steps around the selected frequency to offer a more accurate estimation. If appropriate, the search may be repeated with smaller steps. However, steps below 200 Hz may not result in large improvements.

Figure 17:
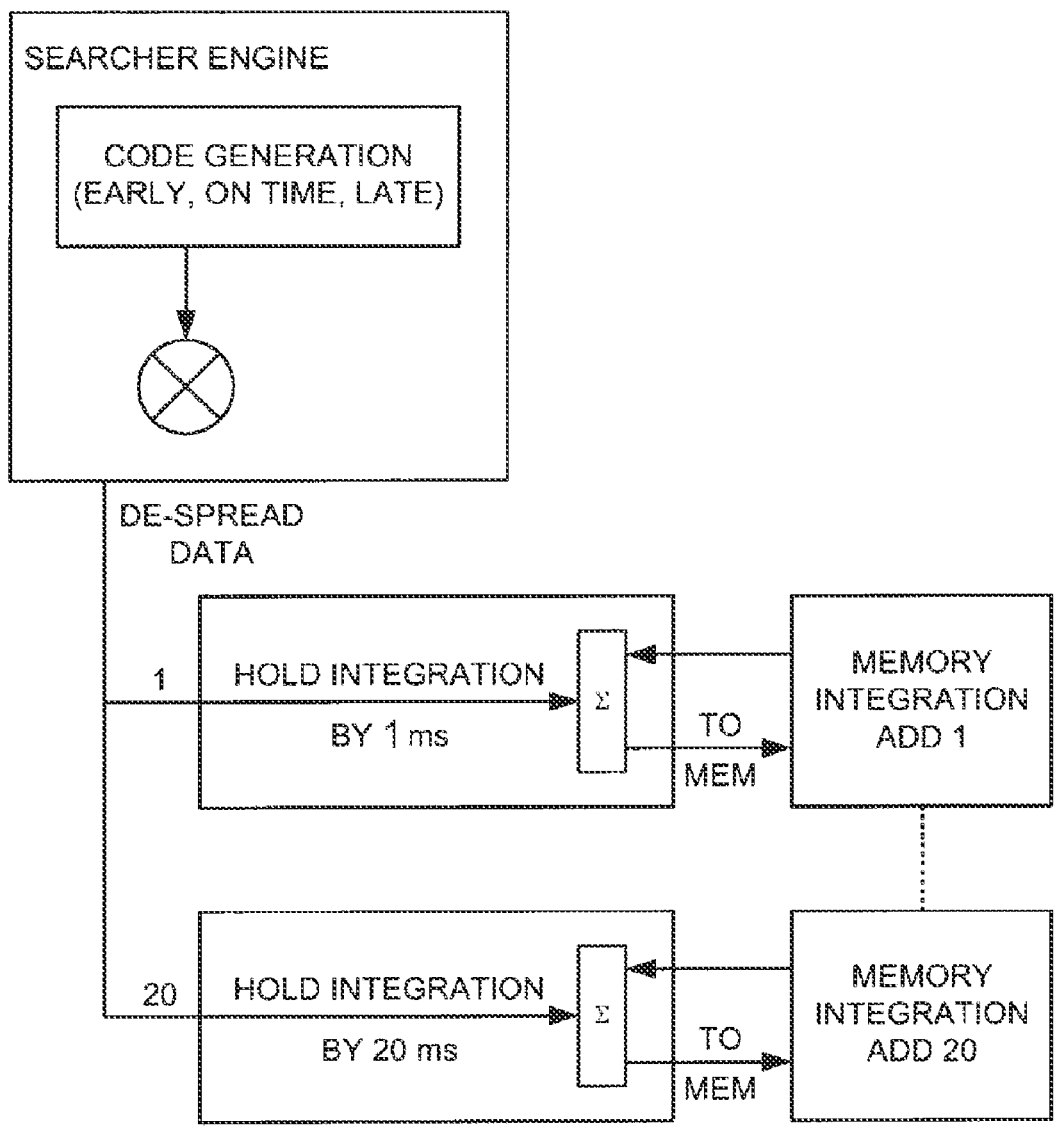
FIG. 17 is a functional block diagram of an example implementation of a method of symbol boundary post-frequency estimation.

Referring to FIG. 17, a functional block diagram of an example implementation of a method of symbol boundary post-frequency estimation is shown. The post-frequency estimation mode may be achieved using the search engine coherent accumulations using 2 searcher engines and its associated memory. The estimation generally uses the memory attached to a semi-coherent processing buffer. The start of every proposed symbol accumulation boundary may be delayed by 1 ms (1023 chips) for an integration period of 40 ms. In such scenarios, the searcher statistically (eventually) will detect a boundary within a few symbols (>~8).

In the symbol boundary search mode, 2 search engines may be working on independent accumulation lengths by holding an accumulation starting point at the memory access. Such a solution generally reuses the search memory. The search is generally applied to 3 offsets (e.g., an Early (E) offset, an On Time (OT) offset and a Late (L) offset). The specific search generally maintains the codes offsets as the same for 20 consecutive operations of the engine. The boundary search of 20 Gi lengths symbol may use 2 engines, each one having 32 memory spaces sufficient to store the 3 offsets (E,OT,L). The operation can run continuously with semi-coherent results to increase the probability of boundary detection for the cases of low signal-to-noise ratio. This boundary estimation should be verified in the tracking engine or by detecting the telemetry word using the same procedure but for a longer accumulation period.

The pre-frequency estimation boundary may be useful to obtain a reference for longer coherent accumulations/detections. An artificial symbol may be created at the end of every 1 ms (1023 chips) utilizing the 4 more energetic stored paths I,Q offsets located in the I,Q selected buffer before the semi-coherent process/operation.

The detection is generally achieved by scaling the received new coherent integration value (1023 chips), creating two proposed values (1, −1) and accumulating the proposed values with a scaled value from memory. The two values may be compared and the maximum is selected and re-stored ready for the next operation. At the same time, a selected sign value is recorded to determine the number of plus (+) and minus (−) values. The values may be evaluated to determine when a transition happens (for example 20 +ve and 20 −ve values).

The boundary detection is generally applied in the coherent results and the semi-coherent results as each performs differently due to the frequency offsets. The semi-coherent accumulation is generally implemented around a sliding window (e.g., around 4 ms). The data values may be continuously normalized so as not to overflow the accumulators.

The data values may be post-processed in the controller to determine the data crossing. The resulting values may be used to determine the coherent accumulator boundary for the Gi frame boundary. A recursive search to verify the boundary may be used to reduce the probability of a false detection.

For the re-acquisition detection mode, up to 4 of the independent search engines may be used where the code generators are programmed independently. If the code offset synchronization position is targeted to the middle of a 32 chip window, the search engines may be able to monitor signals Sa-Sn with frequencies around approximately 1 kHz. Determining the peak-to-mean power may help avoid a false time correction as the energy is scattered around the real peak under larger frequency offsets.

For the re-acquisition detection mode, a 20 ms to 40 ms integration period may be sufficient in most good signal cases. If no detection is achieved, the procedure may search for other good known signals rather than spend time and power on the difficult signals.

An energy/code offset detection function may include a generic peak detection, a local maximum filter (LMF), a sorting/indexing procedure peak detection unit and a modified peak storage area. The energy/code offset detection function may run the LMF on the current results of the search function then process the results through a magnitude compare function. The magnitude compare function may identify data higher than a predetermined threshold defined by the average energy of the current (~1-4 ms) data stored in memory and the average code energy, both stored in the circuit 414. The values may provide a peak-to-mean value to accept within the semi-coherent table. An indexing function may keep the semi-coherent peak storage up to date by updating the detected values after validating the relevance against offset and magnitudes stored in memory.

Figure 18:
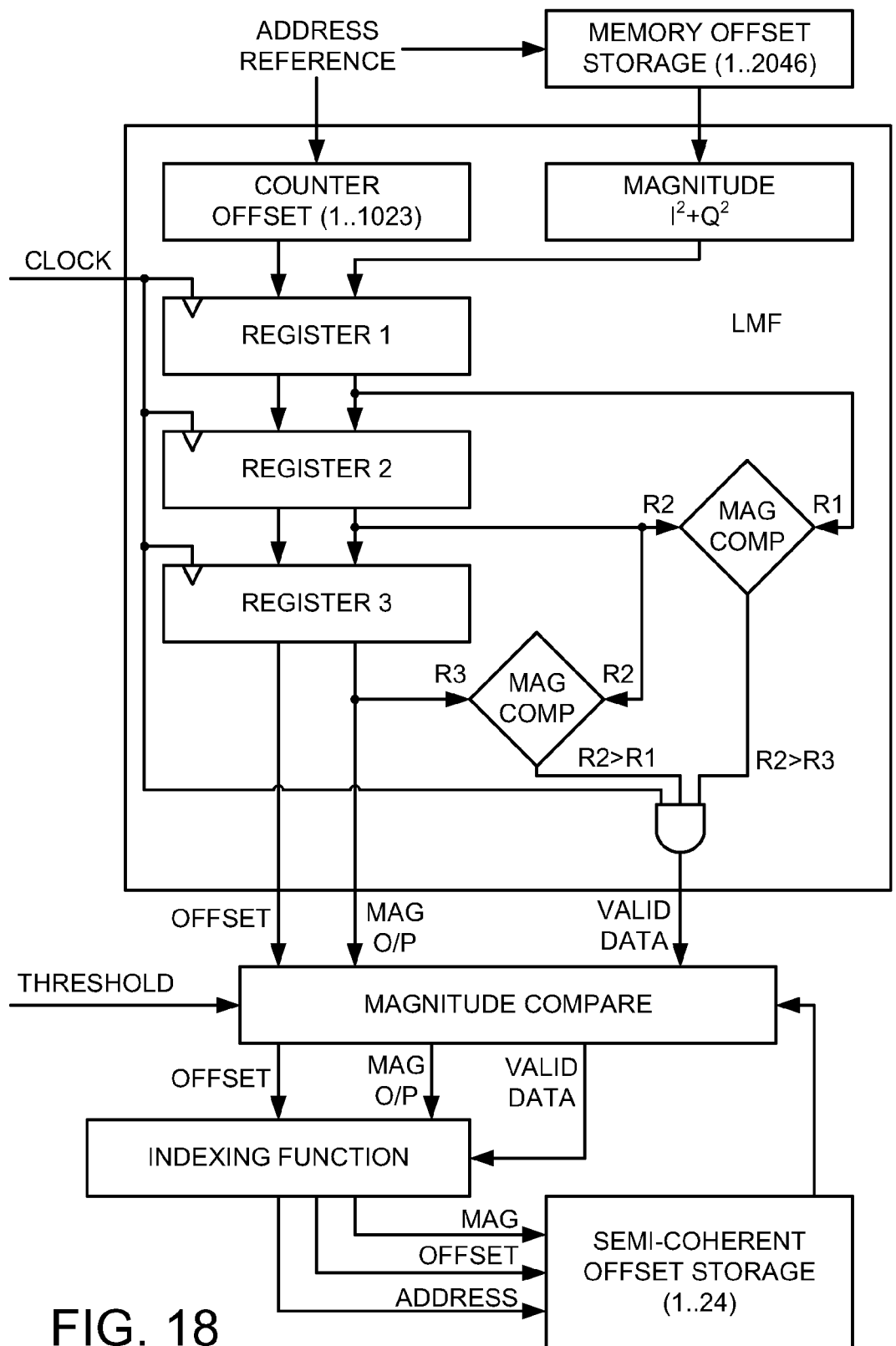
FIG. 18 is a functional block diagram of an example implementation of a local maximum filter.

Referring to FIG. 18, a functional block diagram of an example implementation of a local maximum filter is shown. The local maximum filter generally records the offset and the local energy peaks from the selected input. The LMF function is generally a convenient function to identify the peak energy from a cluster of energy scattered across a few chips. Limitations may be associated where the LMF function is the only detection procedure. Therefore, the LMF function may be used with the whole detection system in order to reduce false detection specifically due to frequency offset.

The LMF function generally processes data from the offset memory and determines local peaks. However, each output marked as valid should be threshold tested to verify validity. The threshold may enable low energy peaks that are just false detections to be ignored. The level of local maximum may thus be extended another two levels to provide the local maximum of a 2-chip window. However, the detected peaks may hide the presence of multi-paths that are good candidates for new search procedures.

Figure 19:
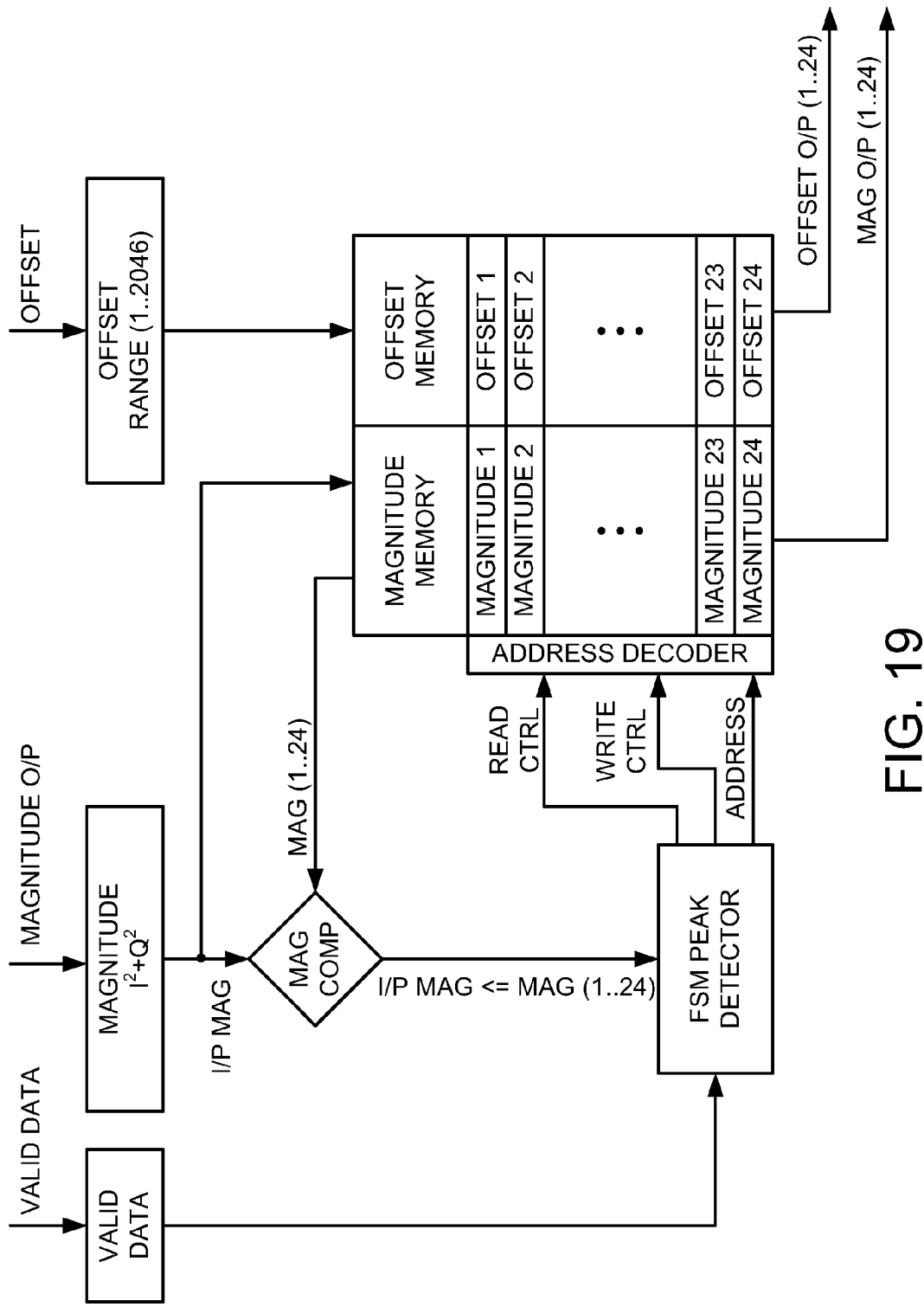
FIG. 19 is a functional block diagram of an example implementation of an indexing function.

Referring to FIG. 19, a functional block diagram of an example implementation of an indexing function is shown. The indexing function generally keeps the highest 24 peaks per Gi code. The peak data may be semi-coherently accumulated in the storage area. The indexing function may keep an average power reference level to make decisions about the energy contribution of the latest received data. The assignation of an index table is generally performed in stages having 16 desired peaks and 8 candidate peaks.

Figure 20:
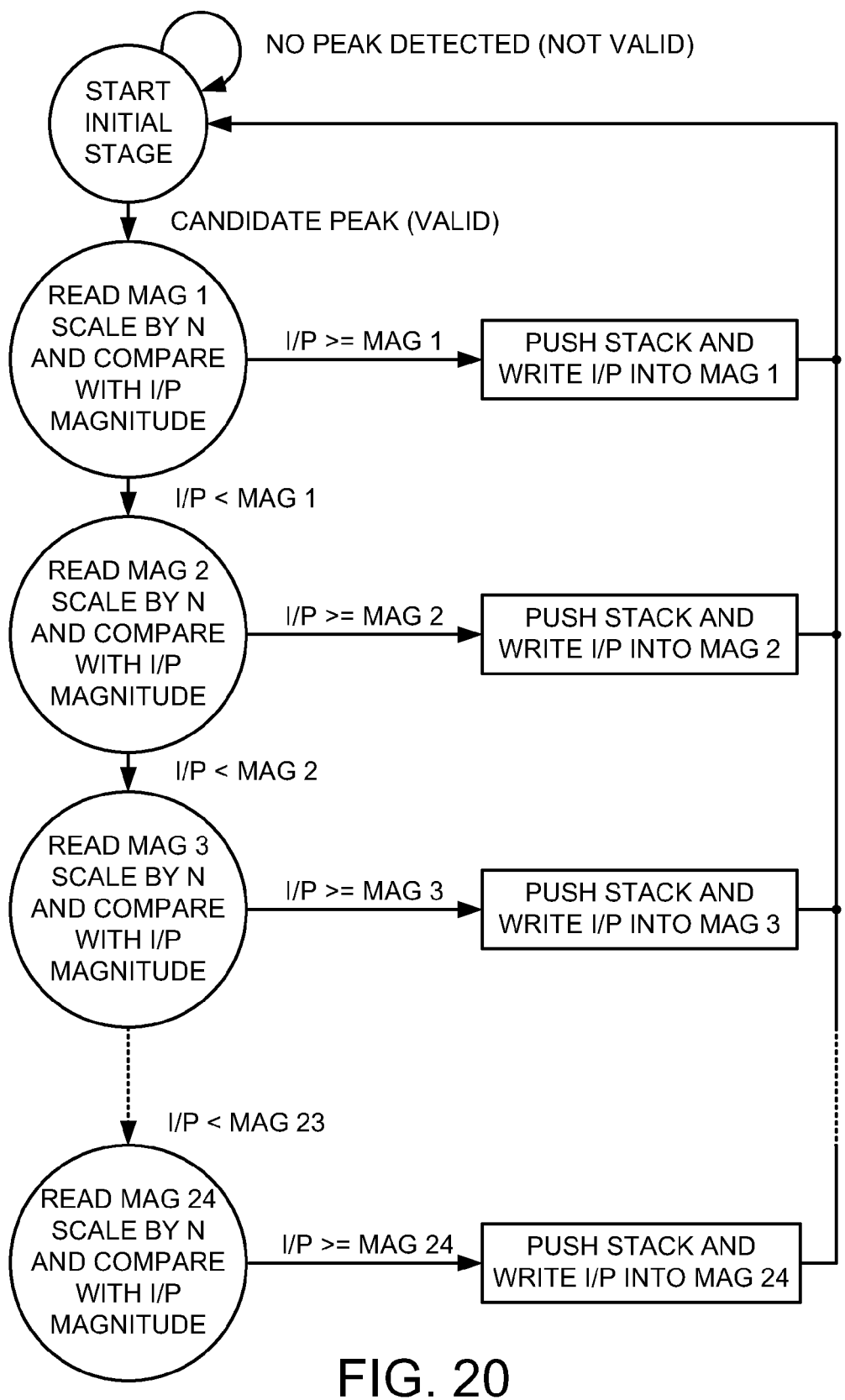
FIG. 20 is a functional block diagram of an example implementation of a peak selection and detection function.

Referring to FIG. 20, a functional block diagram of an example implementation of a peak selection and detection function is shown. The peak selection and detection may be achieved by monitoring energetic peaks and managing the introduction of new peaks. Once the peak selection procedure has selected a first set of peaks/offsets, the energy from the selected peaks may be added to existent selected offsets. New peaks that are detected may be entered in the candidates area. The comparison of new values is generally made against weighted stored values to compensate for the number of accumulations (N≈1024 chips) in the semi-coherent memory.

An indexing function may have a procedure for initial loading of the memory when a new search is started. The initial loading procedure generally loads detected peaks into memory allocated for semi-coherent result stores.

Figure 21:
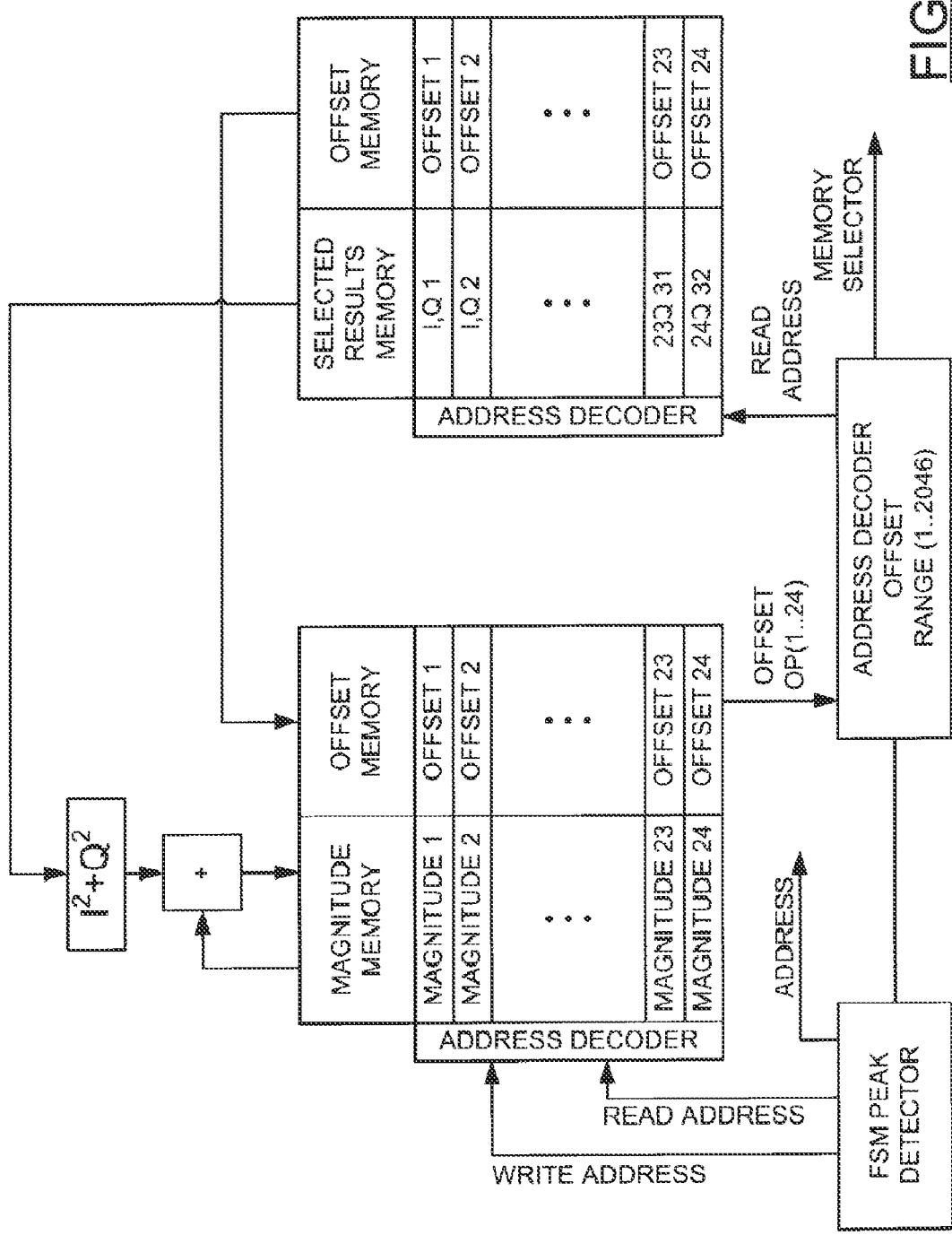
FIG. 21 is a functional block diagram of an example implementation of a ranking function.

Referring to FIG. 21, a functional block diagram of an example implementation of a ranking function is shown. The ranking function may run on two banks (e.g., bank 1 and bank 2). The ranking function may be run when the device 104 is not processing input data samples. The ranking function generally chooses the top (e.g., 64) intermediate results of the last correlation bank not in use and stores the values in the results memory for coherent and semi-coherent results. The values may be stored (i) in I,Q format for a semi-coherent to coherent comparison and (ii) in $I^2+Q^2$ format for the semi-coherent case.

All of the above procedures may be implemented by time multiplexing on specific engines and the interleaved memory. Each entire bank may be processed and may be written at the end of the next integration period. The ranking function generally runs initially with cleared memory and sets the results from the first pass in a table in memory. As values and memory locations are stored, no bias may be used against identical results since the ranking function implements a 'first come first serve' approach. The second pass generally updates (reads and accumulates) the top (32,48) results and updates the last (32,16) values for the cases where new paths appear in the correlation engines.

During a second pass, the addresses may be compared to decide if the data is in the updated values. Furthermore, data is generally weighted and normalized to provide a clear comparison with the same strategy described above. The table may be re-ranked as a simple swap with a register. Furthermore, the data in the correct bank may be updated with the latest running accumulation to provide coherent accumulations or the semi-coherent results as updated. The ranking procedure may then repeat with the next interleaving bank until the total integration period is achieved.

During the ranking procedure, intermediate results may determine early on that no energy is available in the code or frequency for early change in the search cycle. A simple threshold in the control procedure may be used for the early termination.

Figure 22:
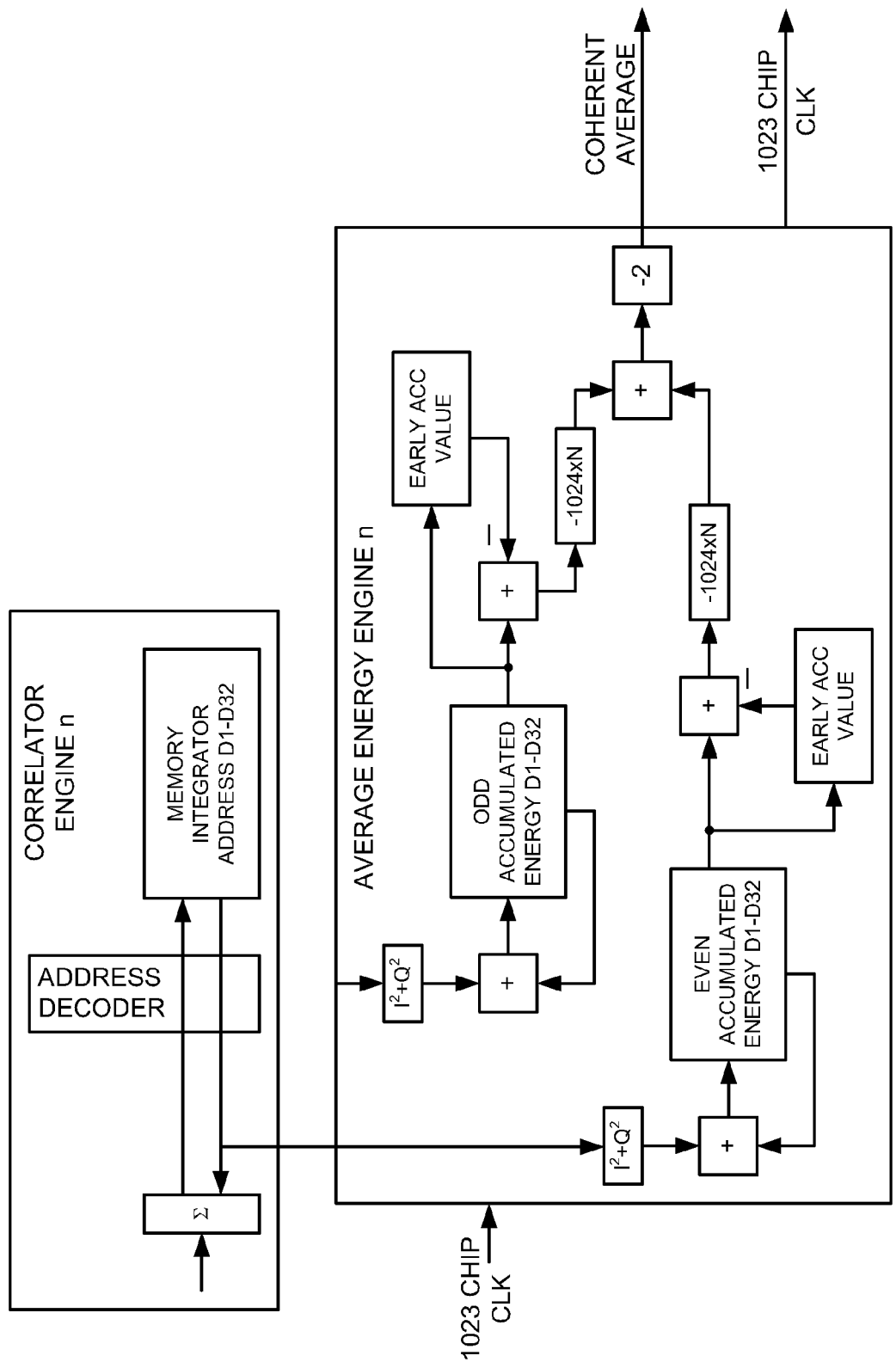
FIG. 22 is a functional block diagram of an example implementation of an average energy/power operation.

Referring to FIG. 22, a functional block diagram of an example implementation of an average energy/power operation is shown. Average energy measurements may be used to set the threshold in the peak detection functions. The average energy is generally measured in intervals of 1 ms. The average energy may be determined by adding the magnitude of all code offsets and dividing the total value by the number of offsets or the closest value (2048 (~1023×2) in the example case). The measurement may be implemented by adding partial coherent results generated by each correlation function every 1023 chips.

The accumulation may happen early in the 1021st chip. The accumulation is usually started at chip 1021, runs for 32 memory accesses and then stops. The accumulator may be cleared and the operation may be repeated every N×1023 samples. The early value of the averaging window may be stored to be ready for the next cycle to determine the next average of energy of the last N×1023 sample integration period.

The average energy/power operation may generate average measurements before the semi-coherent function and the peak detection function. The average measurement values may be updated every 1023 chips. The average code energy generally gives a reference of the eventual peak-to-mean value and may help to determine the threshold for peak detection. The average code energy may also give an indication of the validity of the detected peaks. The average energy/power measurements may be buffered in the semi-coherent integration storage area. The average energy/power measurements may be updated on the same period as the semi-coherent storage function.

Figure 23:
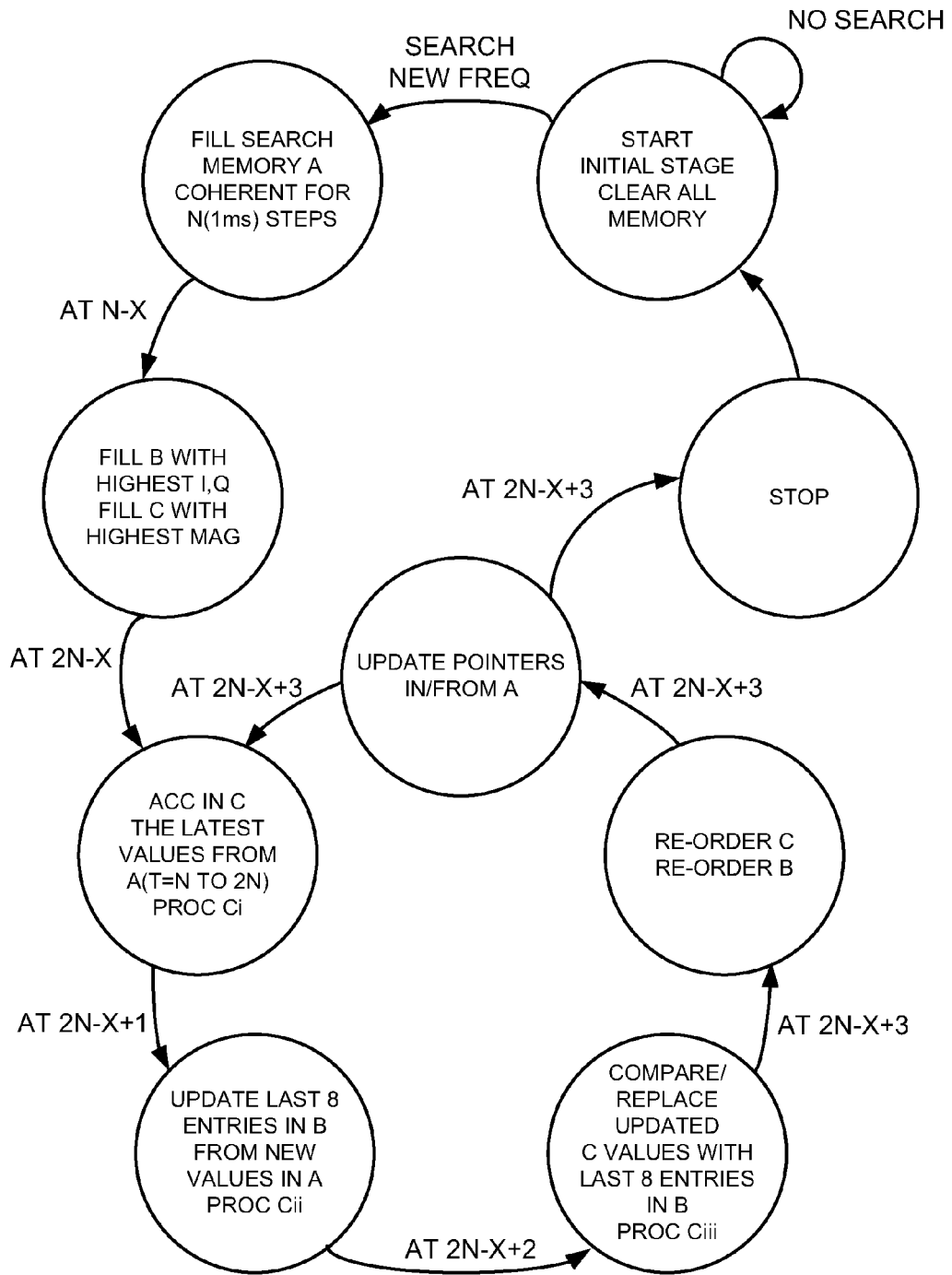
FIG. 23 is a state transition diagram of an example method of controlling the fast acquisition engine.

Referring to FIG. 23, a state transition diagram of an example method of controlling the fast acquisition technique is shown. All measurements may be relative to the average power received in the signals Sa-Sn. The control is generally divided into low-level control and high-level control. The high-level control may provide search modes, such as a blind search mode, re-acquisition mode, boundary search mode and the like. The high-level control may also provide high-level parameters such as a set of codes, thresholds, frequency offsets and, in some cases, integration length. The control procedure generally schedules some of the parameters to match high-level requests with the low-level control and corresponding modes.

The low-level control generally implements direct control of the search engine, codes, modes of operation, internal counters, and the like, used to operate the fast acquisition engine, as described above. The low-level control may operate in several (e.g., 3) main modes related specifically to the frequency searcher.

In a first mode (e.g., MODE 1), an objective may be to discover the code boundary estimations starting from a large frequency offset. The frequency steps may be large relative to the following searches and may control the coherent integration length and the total integration period. The results are often statistically best in the semi-coherent area.

A second mode (e.g., MODE 2) generally assumes that (i) some energy is detected that justifies a closer look at the frequency region, (ii) the coherent and semi-coherent results are expected to give similar results and (iii) the interleaving of the banks is programmed for such an effect on a closed frequency region. The second mode is usually expected to determine the Gi code boundary with good certainty.

A third mode (e.g., MODE 3) generally provides a closed frequency search (e.g., ~100 Hz) in order to determine and provide a reference for the tracking engine 120. The results may be expected to be better in the coherent area and may be used to steer the frequency search into the local maximum in finer steps, if appropriate. Only a few engines may be working in the third mode.

Mode 1 may be suitable for the initial blind acquisition. A starting position may be determined from a temperature reference curve (±7 kHz from expected) plus a Doppler offset (up to 4 kHz). In operation, 3 intermediate frequency settings may be determined to search the code offset space. A value N may be set to a given period (e.g., 3, 4 or 5 ms) for coherent integration. Input parameters may include, a temperature, a frequency offset range estimation, a threshold power, an n×1 ms integration window and an N averaging length. Output values generated while in Mode 1 may include an estimation of frequency, an estimation of coherent power, an estimation of semi-coherent power, an average received power and peak-to-mean estimated values.

In Mode 2, once a code offset has been estimated, then a narrow search in frequency space may be scheduled. The narrow search generally covers a smaller frequency window in order to improve on the frequency estimation offset accuracy. The searches may be executed in parallel over at least 3 frequency offsets. The estimations may execute the code search in a smaller window than in Mode 1. Mode 2 may utilize 32 offsets at half-chip intervals.

Mode 3 is generally suitable (i) for enabling fine tuning (e.g., 50 Hz to 150 Hz spacing) and (ii) to compare the performance of the semi-coherent curve against the coherent accumulation curve.

Mode 3 may also be used to determine the direction of a slope correction.

An example of a Mode 1 integration step for even samples and semi-coherent integration is as follows:

Integrate in A from 1 to 1022

Store A from 1 to 1023 in B (B=A from 1 to 1023) $I^2+Q^2$, process in parallel B to top 64 to C ($C=I^2+Q^2$)

Reset A

Integrate in A from 1024 to 2045. Processing in parallel B, top 64 to C ($C=I^2+Q^2$).

Store (A from 1024 to 2046+(N) (B))/(1−N) in B (B=A from 1 to 2046) $I^2+Q^2$

Interleave

The functions performed by the diagrams of FIGS. 1-23 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s), Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMS (electronically erasable PROMs), UVPROM (ultra-violet PROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants (PDA), portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention. has been particularly shown and described with reference to the preferred embodiments thereof, it will be understood by those skilled in the art that various changes in form and details may be made without departing from the spirit and scope of the invention.

The invention claimed is:

1. A method of fast acquisition of a location of a device, comprising the steps of:
    (A) repeatedly powering up automatically (i) a radio receiver and (ii) a given subset of a plurality of correlators in some of a plurality of search engines in said device;
    (B) buffering first data of a plurality of position signals received through said radio receiver over a first period, each of said position signals comprising a respective one of a plurality of code sequences;
    (C) searching through said first data with said correlators to find at least one of said code sequences, each of said correlators using a search window comprising a fraction of a code length of said code sequences; and
    (D) generating an output signal carrying a location of said device based on said position signals corresponding to said code sequences that were found.

2. The method according to claim 1, further comprising the step of:
    accumulating at most 24 correlation peaks corresponding to each of said code sequences being searched, said correlation peaks comprising (i) a first group of highest peaks used in evaluating acquisition of said code sequences and (ii) a second group of candidate peaks.

3. The method according to claim 2, further comprising the step of:
    entering each new correlation peak detected as one of said candidate peaks.

4. The method according to claim 1, further comprising the steps of:
    generating a plurality of coherent scores by coherently integrating said code sequences respectively during said search through said first data; and
    generating a plurality of non-coherent scores by non-coherently integrating said code sequences respectively during said search through said first data, said non-coherent integration being performed in parallel with said coherent integration.

5. The method according to claim 4, further comprising the step of:
    calculating a plurality of signal strengths of said position signals as differences between said coherent scores and said non-coherent scores respectively.

6. The method according to claim 5, further comprising the step of:
    buffering second data of said position signals received through said radio receiver over a second period upon finding at least one acceptable signal among said position signals from said search through said first data.

7. The method according to claim 6, further comprising the step of:
    integrating said code sequences of said acceptable signals with said second data using (i) said non-coherent integration where said acceptable signals are strong and (ii) said coherent integration where said acceptable signals are weak.

8. The method according to claim 1, further comprising the step of:
    powering up at least one more of said correlators in response to failing to find at least one acceptable signal among said position signals from said search through said first data.

9. The method according to claim 8, further comprising the step of:
buffering second data of said position signals received through said radio receiver over a second period upon failing to find said at least one acceptable signal.

10. The method according to claim 9, further comprising the step of:
searching through said second data with said correlators to find at least one of said code sequences.

11. A device comprising:
a radio receiver configured to receive first data of a plurality of position signals during a first period, each of said position signals comprising a respective one of a plurality of code sequences; and
a processor comprising a plurality of search engines, each of said search engines comprising a plurality of correlators, in a reacquisition mode, said processor is configured to (i) repeatedly power up automatically (a) said radio receiver and (b) a given subset of a plurality of correlators in some of said search engines, (ii) buffer said first data, (iii) search through said first data with said correlators to find at least one of said code sequences, each of said correlators using a search window comprising a fraction of a code length of said code sequences, and (iv) generate an output signal carrying a location of said device based on said position signals corresponding to said code sequences that were found.

12. The device according to claim 11, wherein said search engines together operate on at most 32 code-phase-frequency channels while in said re-acquisition mode, each of said codephase-frequency channels comprising one respective I-channel and one respective Q-channel.

13. The device according to claim 11, wherein said given subset comprises at most four of said correlators in each of said search engines.

14. The device according to claim 11, wherein said fraction of said code sequences comprises at most 32 chips.

15. The device according to claim 11, wherein said processor is configured to power up all of said correlators in all of said search engines while in a full search mode.

16. The device according to claim 11, wherein said processor is further configured to concatenate said correlators in each of said search engines to consider all of said code length.

17. The device according to claim 11, wherein said processor comprises four code generators.

18. The device according to claim 11, wherein processor is further configured to buffer second data of position signals received through said radio receiver over a second period after searching through said first data.

19. The device according to claim 11, wherein said processor is further configured to power up at least one more of said correlators in response to failing to find at least one acceptable signal in said first data in said reacquisition mode.

20. A device comprising:
means for receiving first data of a plurality of position signals during a first period, each of said position signals comprising a respective one of a plurality of code sequences; and
means for processing comprising a plurality of search engines, each of said search engines comprising a plurality of correlators, said means for processing is configured to (i) repeatedly powering up automatically (a) said means for receiving and (b) a given subset of a plurality of correlators in some of said search engines, (ii) buffer said first data, (iii) search through said first data with said correlators to find at least one of said code sequences, each of said correlators using a search window comprising a fraction of a code length of said code sequences, and (iv) generate an output signal carrying a location of said device based on said position signals corresponding to said code sequences that were found.

21. A method of fast acquisition of a location of a device, comprising the steps of:
(A) powering up automatically, in a reacquisition mode, (i) a radio receiver and (ii) a given subset of a plurality of correlators in some of a plurality of search engines in said device;
(B) buffering first data of a plurality of position signals received through said radio receiver from at least one satellite over a first period, each of said position signals comprising a respective one of a plurality of code sequences;
(C) white hot searching through said first data with said correlators to find at least one of said code sequences, each of said correlators using a search window comprising a fraction of a code length of said code sequences;
(D) powering up another correlator if at least one code sequence is not found;
(E) generating an output signal carrying a location of said device based on said position signals corresponding to said code sequences that were found;
(F) repeating steps (B), (C), (D), and (E) if not all correlators have been powered up; and
(F) entering a cold start mode of the device if all of the correlators are powered up and the entire search window has been searched and no code sequence is found.

22. A device comprising:
a radio receiver configured to receive first data of a plurality of position signals from at least one satellite during a first period, each of said position signals comprising a respective one of a plurality of code sequences; and
a processor comprising a plurality of search engines, each of said search engines comprising a plurality of correlators, in a reacquisition mode, said processor is configured to (i) repeatedly power up (a) said radio receiver and (b) a given subset of a plurality of correlators in some of said search engines, (ii) buffer said first data, (iii) white hot search through said first data with said correlators to find at least one of said code sequences, each of said correlators using a search window comprising a fraction of a code length of said code sequences, (iv) power up another correlator if at least one code sequence is not found, and (v) generate an output signal carrying a location of said device based on said position signals corresponding to said code sequences that were found,
the processor further configured to repeat said buffer, power up another correlator and generate an output signal if not all correlators have been powered up, and enter a cold start mode if all of the correlators are powered up and the entire search window has been searched and no code sequence is found.

* * * * *